United States Patent [19]
Stanfill et al.

[11] Patent Number: 5,966,072
[45] Date of Patent: *Oct. 12, 1999

[54] EXECUTING COMPUTATIONS EXPRESSED AS GRAPHS

[75] Inventors: Craig W. Stanfill, Waltham; Clifford A. Lasser, Cambridge; Robert D. Lordi, Wayland, all of Mass.

[73] Assignee: Ab Initio Software Corporation, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/678,411

[22] Filed: Jul. 2, 1996

[51] Int. Cl.$^6$ ........................................... G06F 15/00
[52] U.S. Cl. ............................................... 340/440
[58] Field of Search ................................. 395/140, 141; 345/440, 441, 133, 117, 118

[56] References Cited

U.S. PATENT DOCUMENTS 5,430,870   7/1995   Stanton et al. ........................ 395/600

OTHER PUBLICATIONS

IBM, Database 2 AIX/6000 Programming Reference manual, 1993, pp. 282–283.

Apers, Peter M.G., et al., "Prisma/DB: A Parallel, Main Memory Relational DBMS", Dec. 1992, IEEE Transactions on Knowledge and Data Engineering, vol. 4, No. 6, pp. 541–554.

Boral, Haran, et al., "Prototyping Bubba, A Highly Parallel Database System", Mar. 1990, IEEE Transactions on Knowledge and Data Engineering, vol. 2, No. 1, pp. 4–23.

DeWitt, David J., et al., "The Gamma Database Machine Project", Mar. 1990, IEEE Transactions on Knowledge and Data Engineering, vol. 2, No. 1, pp. 44–62.

Frieder, Ophir and Chaitanya K. Baru, "Site and Query Scheduling Policies in Multicomputer Database System", Aug. 1994, IEEE Transactions on Knowledge and Data Engineering, vol. 6, No. 4, pp. 609–619.

Graefe, Goetz, "Volcano—An Extensible and Parallel Query Evaluation System", Feb. 1994, IEEE Transactions on Knowledge and Date Engineering, vol. 6, No. 1, pp. 120–135.

Graefe, Goetz and Diane L. Davison, "Encapsulation Parallelism and Architecture–Independence in Extensible Database Query Execution", Aug. 1993, IEEE Transactions on Software Engineering, vol. 19, No. 8, pp. 749–764.

*Primary Examiner*—Phu K. Nguyen
*Attorney, Agent, or Firm*—Fish & Richardson P.C.

[57] ABSTRACT

A method and apparatus by which a graph can be used to invoke computations directly. Methods get information into and out of individual processes represented on a graph, move information between the processes, and define a running order for the processes. An application writer informs a system incorporating the invention how processes should access necessary data. The invention adds "adaptor processes", if necessary, to assist in getting information into and out of processes. In general, in one aspect, a method executes on a computer system a computation expressed as a graph comprising a plurality of vertices representing computational processes, each vertex having an associated access method, and a plurality of links, each connecting at least two vertices to each other and representing a flow of data between the connected vertices, comprising the steps of: (1) accepting the graph into the computer system as user input; (2) preparing the graph for execution by performing, on the computer system, graph transformation steps until each vertex is in a runnable state, and each link is associated with at least one communication method compatible with the access methods of the vertices connected by the link; (3) launching each link by creating, by means of the computer system, a combination of communication channels and/or data stores, as appropriate to the link's communication method; and (4) launching each process by invoking execution of the process on the computer system.

18 Claims, 21 Drawing Sheets

EXECUTING COMPUTATIONS EXPRESSED AS GRAPHS

BACKGROUND OF THE INVENTION

1. Field of the Invention

The invention relates to the control of computations in data processing systems and, more particularly, to the execution of programs expressed as graphs in parallel or distributed environments.

2. Background

Complex business systems typically process data in multiple stages, with the results produced by one stage being fed into the next stage. The overall flow of information through such systems may be described in terms of a graph, with vertices in the graph representing either data files or processes, and the links or "edges" in the graph indicating that data produced in one stage of processing is used in another.

The same type of graphic representation may be used to describe parallel processing systems. For purposes of this discussion, parallel processing systems include any configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof. Again, the graphs will be composed of data, processes, and edges or links. In this case, the representation captures not only the flow of data between processing steps, but also the flow of data from one processing node to another. Furthermore, by replicating elements of the graph (files, processes, edges), it is possible to represent the parallelism in a system.

However, while such a graph may be useful for understanding of complex programs, such a graph cannot be directly used to invoke computations because:

(1) It does not tell how to get information in and out of the individual processes.
(2) It does not tell how to move information between the processes.
(3) It does not tell what order to run the processes in.

Accordingly, it would be useful to have a system and method for executing computations expressed as graphs. The present invention provides such a system and method.

SUMMARY OF THE INVENTION

The invention provides a method and apparatus by which a graph can be used to invoke computations directly. The invention provides methods for getting information into and out of individual processes represented on a graph, for moving information between the processes, and for defining a running order for the processes. It allows an application writer to inform a system incorporating the invention how processes should access necessary data. It includes algorithms that choose inter-process communication methods and algorithms that schedule process execution. The invention adds "adapter processes", if necessary, to assist in getting information into and out of processes. The invention also provides for monitoring of the execution of the graph.

In general, in one aspect, the invention provides a method for executing, on a computer system, a computation expressed as a graph comprising a plurality of vertices representing computational processes, each vertex having an associated access method, and a plurality of links, each connecting at least two vertices to each other and representing a flow of data between the connected vertices, comprising the steps of:

(1) accepting the graph into the computer system as user input;
(2) preparing the graph for execution by performing, on the computer system, graph transformation steps until the graph is in an executable form, and each link is associated with at least one communication method compatible with the access methods of the vertices connected by the link;
(3) launching each link by creating, by means of the computer system, a combination of communication channels and/or data stores, as appropriate to the link's communication method; and
(4) launching each process by invoking execution of the process on the computer system.

The invention has a number of advantages. For example, the invention makes it possible to express applications in a manner independent of the data transport available on the target machine. Also, the invention makes it possible to express applications in a manner independent of the data access methods required by the component programs. Further, the invention frees the application writer from the necessity of planning the order in which various computing steps will be invoked. The invention also frees the application writer from the necessity of writing code to create and destroy communication channels and temporary files.

Other advantages and features will become apparent from the following description and from the claims.

BRIEF DESCRIPTION OF THE DRAWINGS

The accompanying drawings, which are incorporated in, and constitute a part of, the specification, schematically illustrate specific embodiments of the invention and, together with the general description given above and the detailed description of the embodiments given below, serve to explain the principles of the invention.

Like reference numbers and designations in the various drawings indicate like elements.

DETAILED DESCRIPTION

Overview of Computational Substrate

Figure 1A:
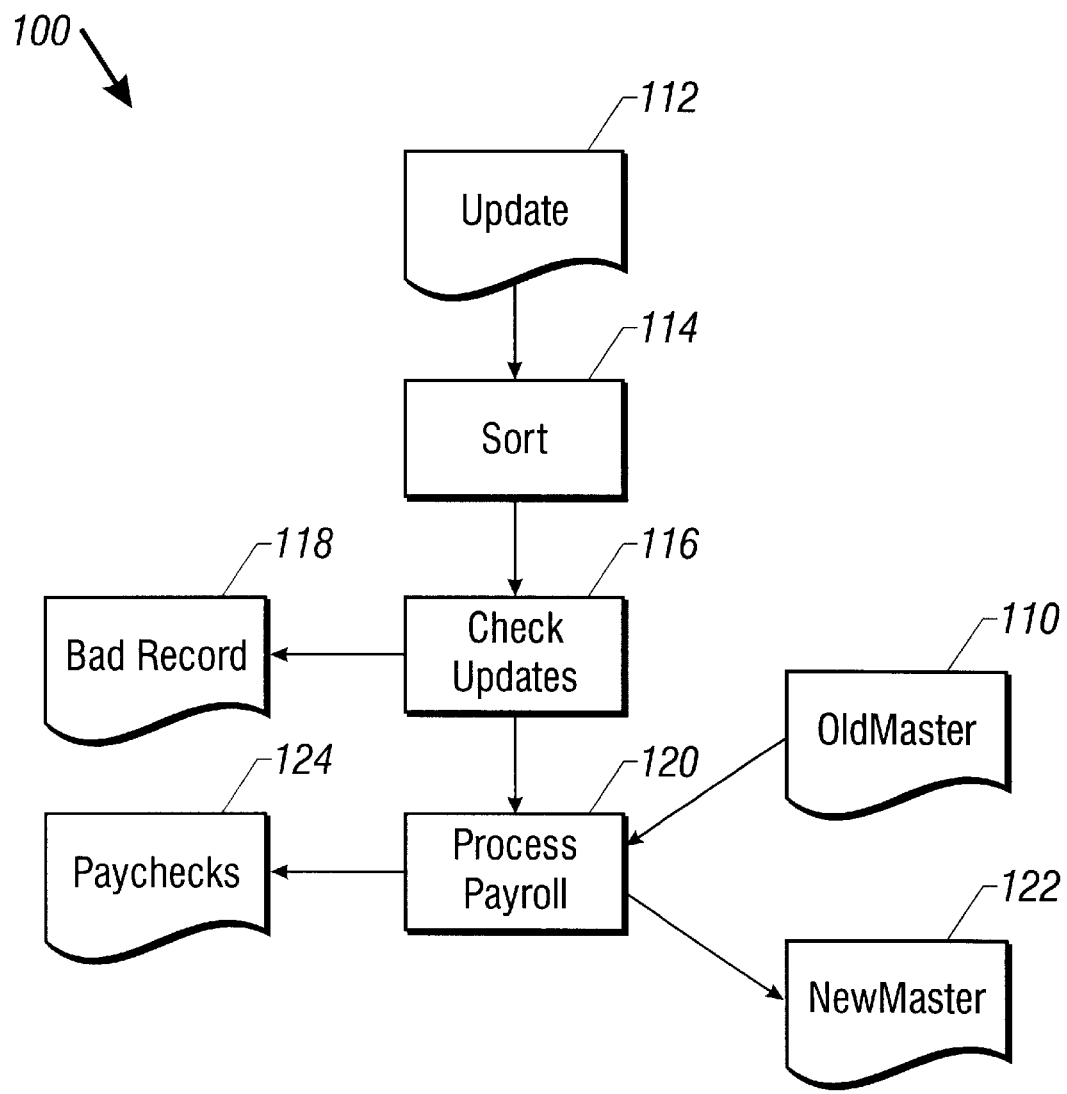
FIG. 1a is a graph illustrating the flow of data through a simplified sample example of a prior art payroll system.

A graph execution system and a graph execution method for executing a computation expressed as a graph, in accordance with the present invention, will often be used in a computational environment or substrate having the following commonly-available facilities: communication channels, data stores, process control and data access methods. For that reason, the graph execution system and the graph execution method will be described in reference to such a reference substrate, although the system and method are not limited to such substrates.

As to communication channels, the reference substrate provides facilities to create and destroy communication channels, and to do so on remote processors if the system or method are to be used in a distributed environment. Such communication channels may serve to transmit data between two processes on the same processor or between two processes on different processors. Several kinds of communication channels may be provided. As to data stores, the reference substrate provides facilities to create data stores, and to do so on remote processors if the system or method are to be used in a distributed environment. Data stores are memories that preserve data between jobs or between stages of processing. The substrate also provides mechanisms which allow processes to read/write the contents of data stores. In some cases, the substrate may provide mechanisms by which a process may read/write the contents of a data store located on a remote node, but such facilities are not required by the present invention. As to process control, the substrate provides facilities to start a process, to determine when it has finished execution, and to determine whether or not the process terminated normally. The substrate provides facilities to start a process on remote processors if the system or method are to be used in a distributed environment. The operation of starting a process must allow parameters to be passed, including the name of the program to be run and identifiers for any files or communication channels to be accessed. As to data access methods, the substrate provides facilities for data access methods that processes running on the substrate may use.

A useful substrate may be developed as an extension of the substrate provided by any of various versions of the UNIX operating system. The UNIX operating system provides two types of communication channels: named pipes and TCP/IP streams. A named pipe is a point-to-point communication channel that may be used to transmit data between processes on the same node. (The term "node" refers to a computer, possibly having multiple processors and storage devices or data stores, but having a single pool of shared memory.) A named pipe is identified by a path in a file system. A TCP/IP stream is a point-to-point communication channel that may be used to transmit data between two processes anywhere on a TCP/IP network (e.g., the Internet). Establishing a TCP/IP stream requires the use of a protocol by which the two processes establish a connection. Many such protocols are in use, but most are oriented towards establishing client-server connections rather than peer-to-peer connections required by the system.

The extended substrate provides one additional type of channel called shared memory. Shared memory is a pool of memory that is accessible by multiple processes and that may be used for transmitting data, in known fashion. A shared memory channel includes mechanisms for synchronizing access. Shared memory is applicable to transmitting data between processes on the same node and is an efficient substitute for named pipes.

For use with the present invention, the TCP/IP connection protocol of the extended substrate should be suitable for peer-to-peer links. In such a protocol, an entity creates a "stream identifier" and arranges for both end points of the desired stream to receive the stream identifier. The two end points give the stream identifier to the substrate and receive in response a connection to a TCP/IP stream. A similar mechanism is used to establish shared memory communication channels. Creation of such a protocol is well-known in the art.

The UNIX operating system provides three data access methods: a file interface, a stream interface, and a file descriptor interface. With the file interface, a program may be provided the name of a file, and then may open it, read from it, write to it, and seek within it. With a stream interface, a program may be provided the name of a file or a named pipe, and then may open it, read from it, or write to it. A stream interface does not allow the use of a seek operation or other operations that are applicable only to files. With a file descriptor interface, a file descriptor (identified by a number, for example) may be bound to a file, a named pipe, or a TCP/IP stream before a program is invoked. The program may then read from the file descriptor or write to it. This is similar to the stream interface, except that with the stream interface the stream is opened outside the program, that is, before the program is invoked.

For use with the present invention, the extended substrate provides one additional access method, stream object connections (SOCs). A "stream object" is created by presenting the extended substrate with a "stream object identifier" (a unique string), a "communication method name", and a "channel/file identifier", which may be the name of a file or a named pipe, or an identifier to be used in creating a TCP/IP stream or shared memory channel. The caller must also provide the identities of the nodes where the source and destination are located.

The UNIX operating system provides one type of data store: files. A file is sequence of bytes, stored typically on disk. A file is identified by a path in a file system and an identifier identifying its host, i.e., the node on which it resides.

The UNIX operating system provides process control. To start a process, the following information is provided: the name of the program to run, any command line arguments, and any bindings for file descriptors. Command line arguments may contain the names of files and named pipes to be accessed by the program. Each binding for a file descriptor consists of a file descriptor number and either a path identifying a file or named pipe, or an auxiliary channel identifying a TCP/IP stream. In addition, command line arguments may contain values for environment variables, which are commonly required by UNIX programs to describe where certain resources may be located or to configure execution options.

Overview of Graphs

The inventive system keeps track of the state of the computation in the state variables of a set of process vertices, a set of file vertices, and a set of data links, each of which will now be described. The operation of a system using these constructs will be described later.

To illustrate some of the concepts of the present invention, an example of the prior art will be used. FIG. 1a illustrates the flow of data through a simplified example of a prior art payroll system. The inputs to this example are an old master file 110 containing permanent records for all employees and an update file 112 containing one week's worth of time sheets. The old master file 110 is sorted by employee ID. The graph shows the following flow of data:

(1) The update file 112 is sorted, step 114.
(2) The updates are checked, step 116, with bad records being put into a bad records file 118.
(3) The updates from step 116 plus the old master file 110 are processed, step 120, to produce a new master file 122 plus a set of paychecks 124.

Process Vertex

A process vertex contains the following information:
a process vertex identifier;
a program template;
a working directory identifier that identifies a working directory (that is, a directory where scratch files may be created); and
a working node identifier that identifies a working node (that is, a node where processing is to take place);
a state variable which has one of the following values: Disabled, Enabled, Runnable, Unrunnable, or Done (initially, Disabled).
A flag to indicate if the vertex is an adapter vertex (discussed below).

The following table illustrates the contents of three process vertices for the sort, check, and process processes (programs) shown in FIG. 1a:

| Identifier | Program Template | Working Directory | Working Node | State | Adapter Vertex? |
|---|---|---|---|---|---|
| Sort | Sort Template | /work/tmp | node 1 | Disabled | False |
| Check | Check Template | /work/tmp | node 1 | Disabled | False |
| Process | Process Template | /work/tmp | node 1 | Disabled | False |

File Vertex

A file vertex relates to a file and contains the following information:

a file vertex identifier;
a data node identifier;
a data file identifier;
a working node identifier that identifies a working node, which may be used by programs wishing to access the file (this will usually be identical to the data node);
a working directory identifier that identifies where programs wishing to access the file may create scratch files (this normally will be in the same file system as the data file); and
a state variable that has one of the following values: Complete, Incomplete (initially, Incomplete).

In cases where the computational substrate provides for data stores other than files, the information in a file vertex may be extended to include an indicator indicating the type of data store and information required to identify and use it.

The following table illustrates the contents of five file vertices for the files shown in the graph of FIG. 1a:

| File Vertex Identifier | Data Node | Data File Identifier | Working Node | Working Directory | State |
|---|---|---|---|---|---|
| OldMaster | node 0 | /data/master.old | node 0 | /work/tmp | Incomplete |
| Update | node 2 | /input/update | node 2 | /work/tmp | Incomplete |
| BadRecs | node 1 | /err/bad-recs | node 1 | /work/tmp | Incomplete |
| Paychecks | node 1 | /output/paychk | node 1 | /work/tmp | Incomplete |
| NewMaster | node 0 | /data/master.new | node 0 | /work/tmp | Incomplete |

Data Link

A data link (or, simply, a "link", for short) contains the following information:

a source vertex—either a file vertex or a process vertex;
a source port identifier—if the source is a file vertex, only Output is permitted;
a destination vertex—either a file vertex or a process vertex;
a destination port identifier—if the destination is a file vertex, only Input is permitted;
a communication method identifier, which may be Unbound or the name of a communication channel type such as File, NamedPipe, TCP/IP, or Shared Memory (initially, Unbound); and
a state variable that may be either Unlaunched or Launched (initially, Unlaunched).

More than one data link may be attached to a given port of a given file vertex or process vertex.

Figure 1B:
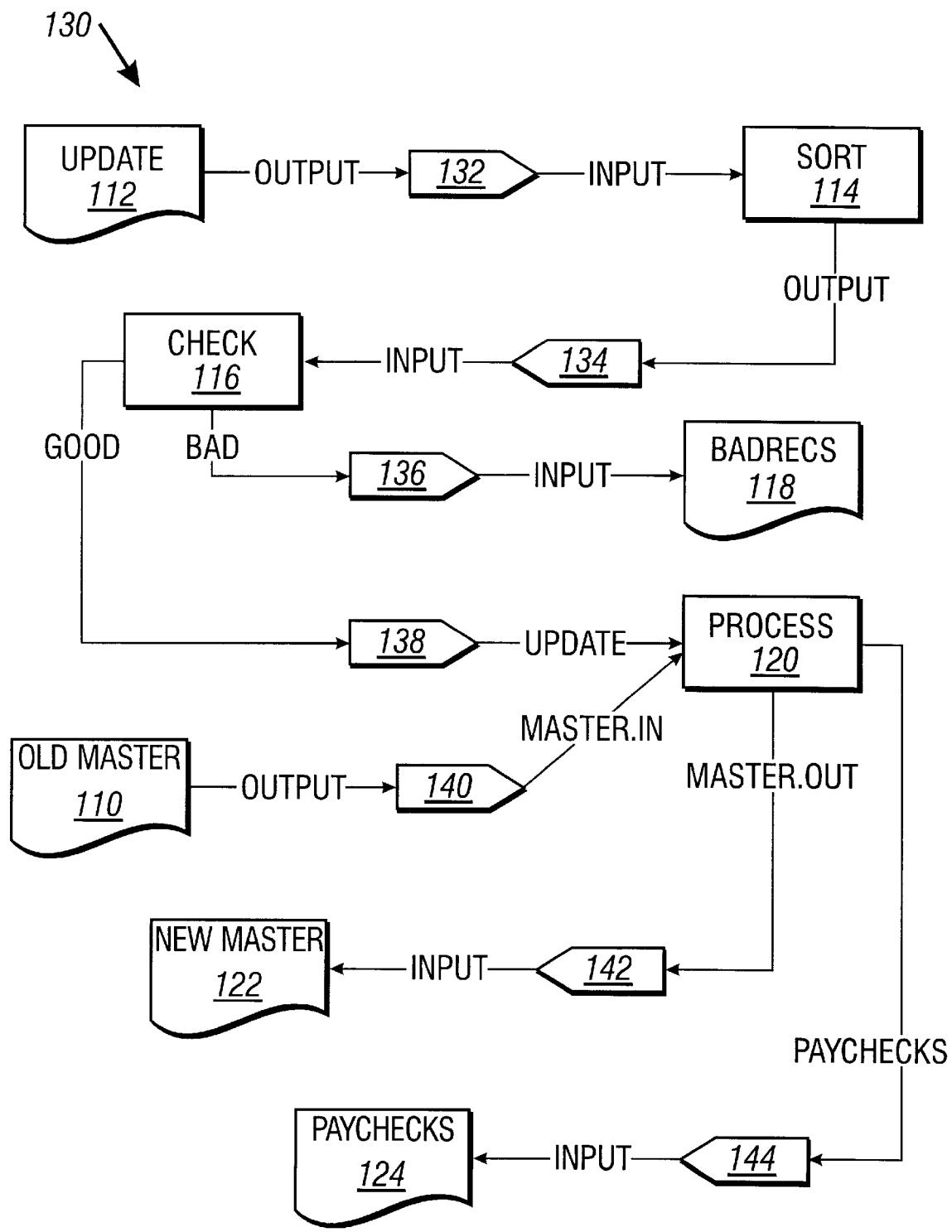
FIG. 1b is graph corresponding to the graph of FIG. 1a in accordance with the present invention.

In FIG. 1a, the connecting arrows graphically depict linkages between process and file vertices. The concept of a link is given more concrete form in the present invention. Turning to FIG. 1b, graph 130 illustrates process vertices, file vertices, and data links derived in accordance with the present invention from the graph 100 illustrated in FIG. 1a.

The following table tabulates the seven data links 132, 134, 136, 138, 140, 142, and 144 shown in graph 130:

| Ref. Num. | Source Vertex | Source Port ID | Destin. Vertex | Destin. Port ID | Comm. Method | State |
|---|---|---|---|---|---|---|
| 132 | Update | Output | Sort | Input | Unbound | Unlaunched |
| 134 | Sort | Output | Check | Input | Unbound | Unlaunched |
| 136 | Check | Bad | BadRecs | Input | Unbound | Unlaunched |
| 138 | Check | Good | Process | Update | Unbound | Unlaunched |
| 140 | OldMaster | Output | Process | Master.in | Unbound | Unlaunched |
| 142 | Process | Master.out | NewMaster | Input | Unbound | Unlaunched |
| 144 | Process | Paychecks | Paychecks | Input | Unbound | Unlaunched |

Program Template

A process vertex includes a program template. A program template contains two basic kinds of information about a program: (1) information needed to invoke the program, such as the name of the program, command line arguments, and environment variables; and (2) an array of port descriptors that describe the means by which the program accesses data. The exact form of the invocation information depends on the computational substrate. For the UNIX-based substrate that has been described, the program name is the name of an executable file plus command line arguments consisting of a series of strings separated by spaces. Some of these strings may be in the form of "$portname", where "portname" is the name of one of the ports in the template, and where that port must use the file interface or stream interface data access method. In this case, the string "$portname" will be replaced, at invocation time, by the names of the files or named pipes connected to that port.

The following table illustrates the contents of illustrative program templates for the three programs (processes) shown in the graph 130 of FIG. 1b:

| Template Name | Program | Arguments | Port ID | Direction | Method |
|---|---|---|---|---|---|
| Sort Template | /bin/sort | $Input EmpNo | Input Output | input output | ReqsFile ReqsFD |
| Check Template | /pay/check | $Input $Good $Bad | Input Good Bad | input output output | ReqsNamedPipe ReqsNamedPipe ReqsNamedPipe |
| Procedure Template | /pay/process | null | Master.in Update Master.out Paychecks | input input output output | ReqsSOC ReqsSOC ReqsSOC ReqsSOC |

The information needed to invoke the program may be provided in two forms. First, it may be explicitly stored in the program templates as illustrated in the table above. Second, this information may be dynamically generated, in which case addresses of routines that generate the information will be stored in the program template.

A port descriptor in a program template contains the following information shown as the right-most three elements in the table above:

a port identifier for the port;

an indication as to whether the port is used for input or output; and an acceptable-method code, such as ReqsFile, ReqsNamedPipe, ReqsFD, or ReqsSOC ("Reqs" stands for "Requires"), that indicates which communication methods are acceptable to the port.

These acceptable-method codes refer to the data access methods supported by the computation substrate.

Driver Program

Figure 2:
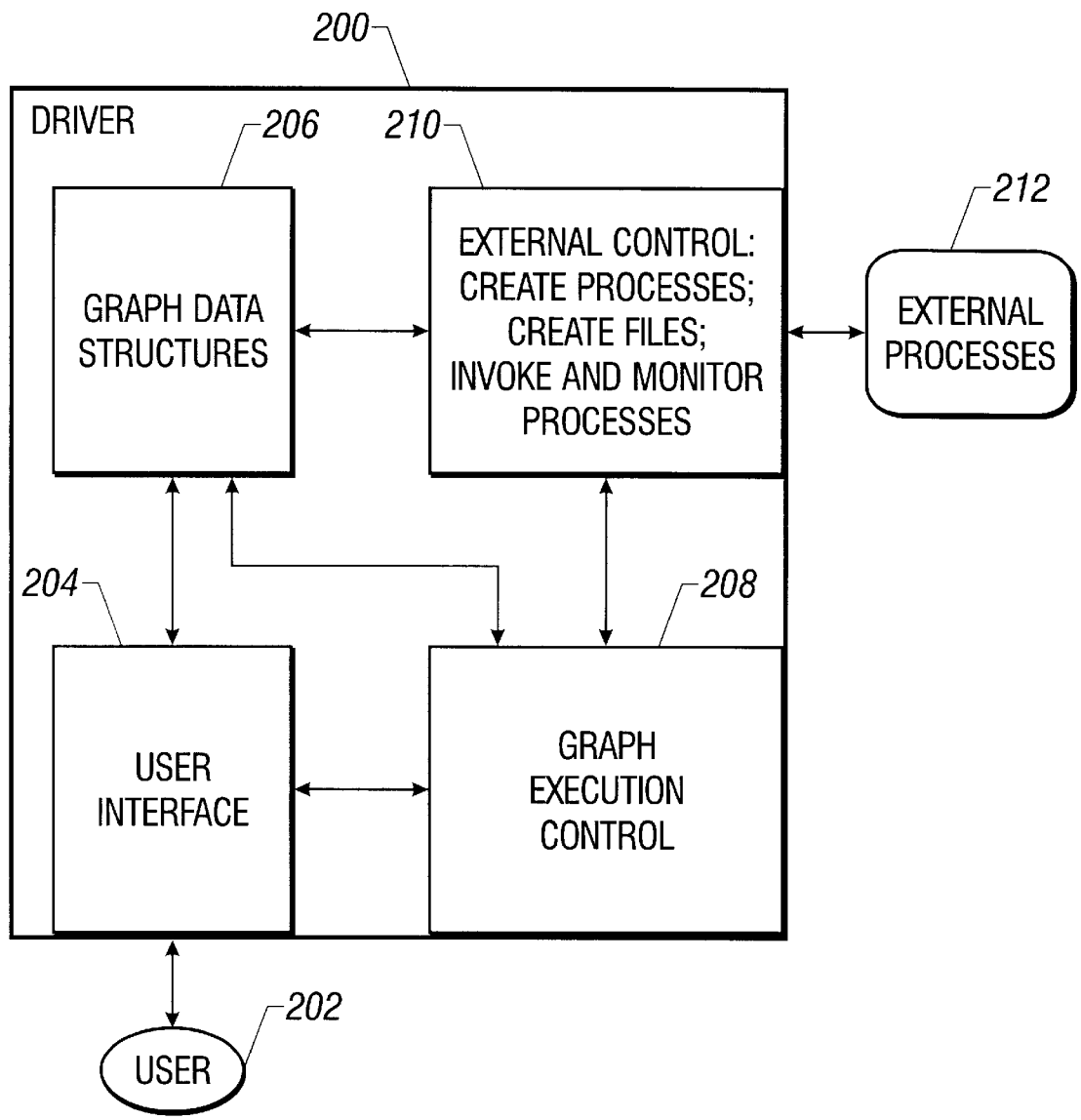
FIG. 2 is a block diagram of a driver program in accordance with the present invention.

Turning to FIG. 2, a driver program 200 (or, simply, a "driver", for short) provides a means for depicting a graph, based on input from a user 202 received through a user interface 204. One or more graph data structures 206 representing a particular graph (for example, such as is shown in FIG. 1b) are generated by the driver 200. A graph execution control function 208 of the driver 200 then permits the driver 200 to perform the following external control 210 functions in any order and as often as required in order to interact with external processes 212:

create a process vertex;

create a file vertex;

create a data link between any pair of vertices (of either kind);

change the current state of a process from Disabled to Enabled; and cause the graph to be executed.

The driver 200 performs these operations ultimately in response to requests made by a user 202 and using information provided by a user 202 through the user interface 204. A user 202 may be a person providing input directly through a graphical user interface to the driver 200. Alternatively, a user 202 may be a separate program that controls the driver 200 through, for example, an object oriented or procedural interface. In this way, the user 202 may use the driver 200 to build and to control the execution of a graph.

The driver 200 may create a process vertex for a graph when the user 202 has provided an identifier, a program template, a working node, and a working directory. The working directory may be given a default value based on the working node.

The driver 200 may create a file vertex for a graph when the user 202 has provided an identifier, a data node, a data filename, a working node, and a working filename. The working node defaults to the data node in the preferred embodiment. The working filename may be given a default value based on the working node and/or the data filename.

The driver 200 may create a data link between any pair of vertices of a graph when the user 202 has provided a source vertex, a destination vertex, a source port identifier, and a destination port identifier. In the preferred embodiment, the source port identifier defaults to Output and the designation port identifier defaults to Input.

By enabling a user 202 to control the Enabled/Disabled state of process vertices, the driver 200 enables the user 202 exercise control over the order of execution of processing, which is described below, by selectively enabling subsets of the process vertices.

Executing a Graph

Figure 3:
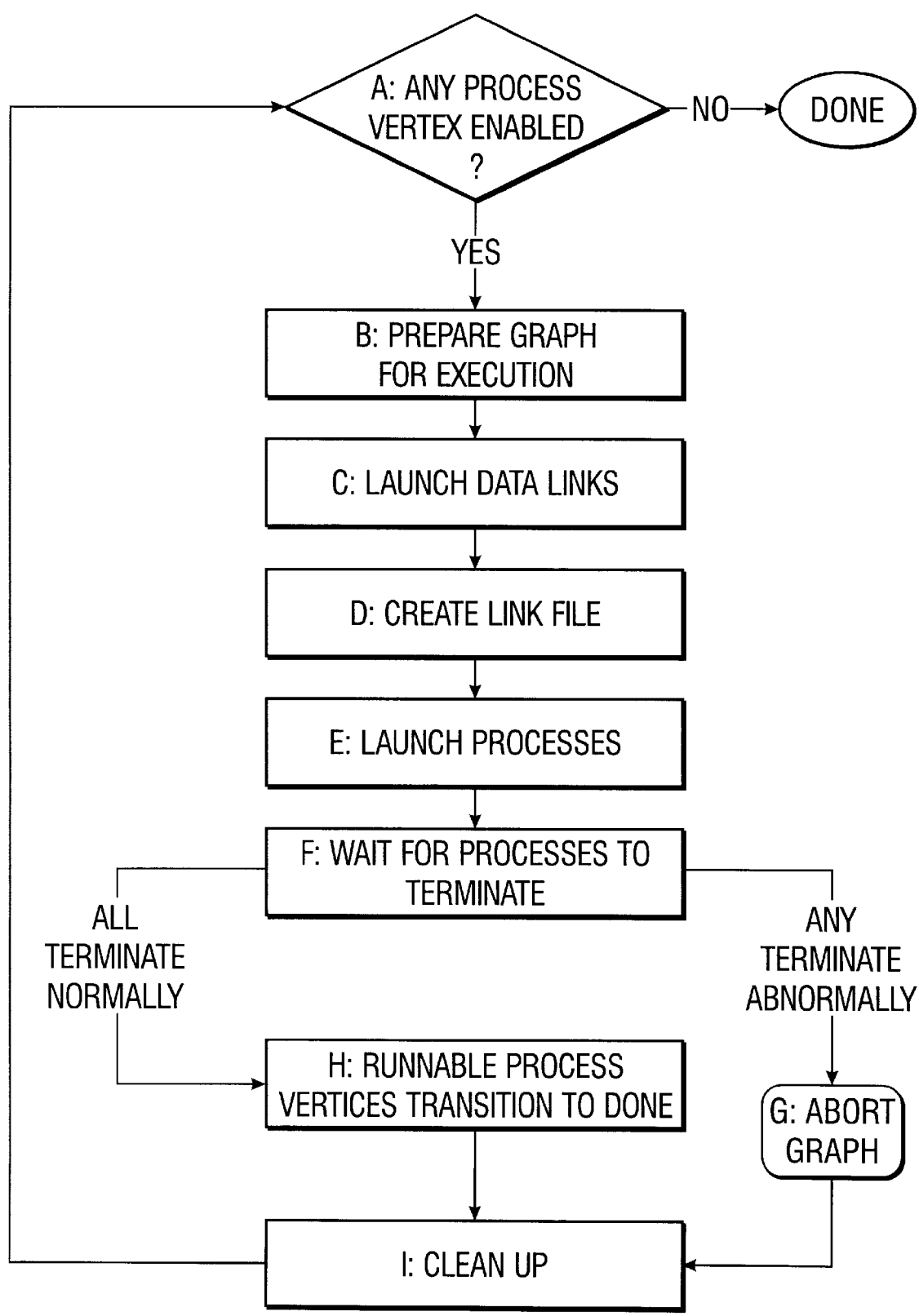
FIG. 3 is a flow diagram of a method for executing a graph in accordance with the present invention.

Turning to FIG. 3, after an initial graph is generated, the driver 200 controls execution of the graph, and hence the processes depicted by the graph. When the driver 200 executes a graph, it does so by performing the following general phases A–I:

A. As long as any one of the process vertices is in the Enabled state, the driver 200 repeats the following steps B–I. The driver 200 may sometimes omit phases C, D, and I, and may intermingle the operations performed in steps B, C, E, and H.

B. The driver 200 prepares the graph for execution. In this phase, the driver 200 identifies Runnable process vertices, chooses communication methods for links, and may generate adapter nodes, as will be described.

C. The driver 200 launches data links, as will be described later in more detail. In this phase, the driver 200 creates certain computational structures required to implement communication methods, as will be described.

D. The driver 200 creates any other data structures or files required by the computational substrate. For the extended substrate described above, the driver 200 creates a link file, as will be described. This permits programs to access graph connectivity information at run time.

E. The driver 200 launches processes, as will be described.

F. The driver 200 waits for the processes to terminate. This phase completes when all processes have terminated successfully, or when any process terminates abnormally.

G. If any process terminates abnormally, execution of the graph is aborted.

H. Otherwise, all process vertices in the Runnable state transition to the Done state. If no process vertices were in the Runnable state, then cleanup phase I will be performed and control returned to the caller (the user 202 of the driver 200, for example) with an indication that execution stalled.

I. The driver 200 cleans up data links and the link file, as will be described. This cleans up some of the data structures created in phases C and D.

Further details of particular phases are described below.

Phase B: Preparing a Graph for Execution

Figure 4A:
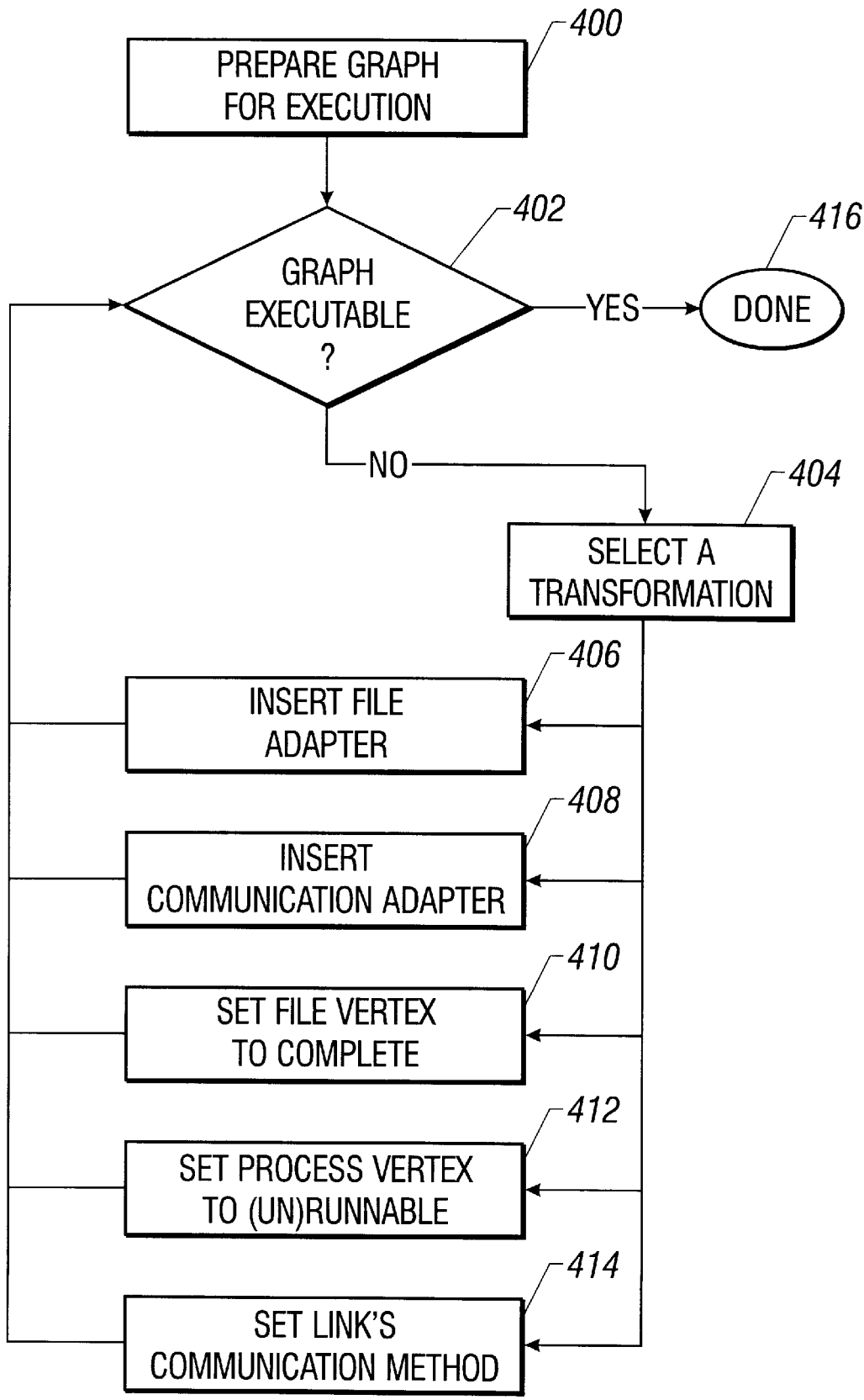
FIGS. 4a and 4b are flow diagrams of a step of the method illustrated in FIG. 3.

Turning to FIG. 4a, the driver 200 accesses a graph initially depicted by a user 202 and prepares that graph for execution by applying graph transformations (step 400). In performing these transformations, the graph data structures defining the initial graph are traversed, in known fashion, to fetch each vertex and any associated links. In the preferred embodiment, five graph transformations are used on the fetched data structures to prepare the graph for execution.

While a graph is still not in executable form (step 402), the five graph transformations described below may be selected and applied in any order (step 404) and as often as required (including not at all) until an executable graph is obtained (step 416). The five graph transformations are (1) inserting a file adapter (step 406), (2) inserting a communication adapter (step 408), (3) setting a file vertex's state to Complete (step 410), (4) setting a process vertex's state to Runnable or Unrunnable (step 412), and (5) setting a data link's communication method (step 414). Each of these transformations and the conditions under which each may be performed will now be described.

Inserting a file adapter

In this transformation, the driver 200 replaces a link with a file adapter (that is, with a link, a file vertex, and another link). That is, as each graph data structure representing a link is fetched or accessed during a traverse of the graph data structures 206 (FIG. 2), a new data structure may be created that modifies, expands on, or substitutes for the original data structure.

For a source (destination) file adapter, the file vertex's host is the same as the source (destination) vertex's host, and the file vertex's file is a new file located in the source (destination) vertex's working directory. This transformation may only be performed if:

(1) the source is either a file vertex or a process vertex which is not in the Done state; and (2) the destination is either a file vertex in the Incomplete state or a process vertex which is not in the Done state.

Inserting a communication adapter

In this transformation, the driver 200 replaces a link with a communication adapter (that is, with a link, a process vertex, and another link). The process vertex runs a copy program, which copies data from its input to its output, and which can read from/write to any of the communication channels or data stores supported by the underlying substrate. For a source (destination) communication adapter, the process vertex's host is the same as the source (destination) vertex's host, and the working directory is the same as the source (destination) vertex's working directory. The process vertex is created in the Enabled state. This transformation may only be performed if:

(1) the source is either a process vertex in a state other than Done, or a file vertex; and (2) the destination is either a process vertex in a state other than Done, or a file vertex in the Incomplete state.

Setting a file vertex's state to Complete

In this transformation, a file vertex's state is set to Complete. This transformation may only be performed if the file vertex's state is Incomplete and all inputs to the file vertex are process vertices in the Done state.

Setting a process vertex's state to Runnable or Unrunnable

In this transformation, a process vertex's state is set either to Runnable or to Unrunnable. This transformation may only be performed if the process vertex's state is Enabled.

Setting a data link's communication method

In this transformation, a communication method is set for a data link. This transformation may only be performed if the data link's communication method is Unbound.

A graph that has the following three properties is executable:

(1) All process vertices are in one of the following states: Done, Runnable, Unrunnable, or Disabled.

(2) All data links satisfy all of the following criteria:
   1) If either the source or destination of a data link is a Runnable process vertex, then the communication method for the data link must be bound to a particular communication method.

2) If the communication method of a data link is anything other than File, then both its source and destination must be process vertices, and if one process vertex is Runnable, then both process vertices must be Runnable.

3) If the communication method of a data link is File, then its source or destination must be a file vertex. If the destination is a Runnable process vertex, then the source must be a Complete file vertex. If the source is a Runnable file vertex, then the destination must be an Incomplete file vertex.

(3) All links bound to a communication method satisfy the constraints inherent in the communication method:

1) The communication method must be compatible with the access methods for its source and destination ports (this may be determined by consulting the program template). In the case of the extended substrate that has been described, all communication methods are compatible with SOC access; all but Shared Memory are compatible with File Descriptor access; NamedPipe and File are compatible with NamedPipe access; and only files are compatible with File access.

2) Some communication methods require that the nodes of the source and destination vertices be identical. For the extended substrate that has been described, this is true for all communication methods other than TCP/IP.

Figure 4B:
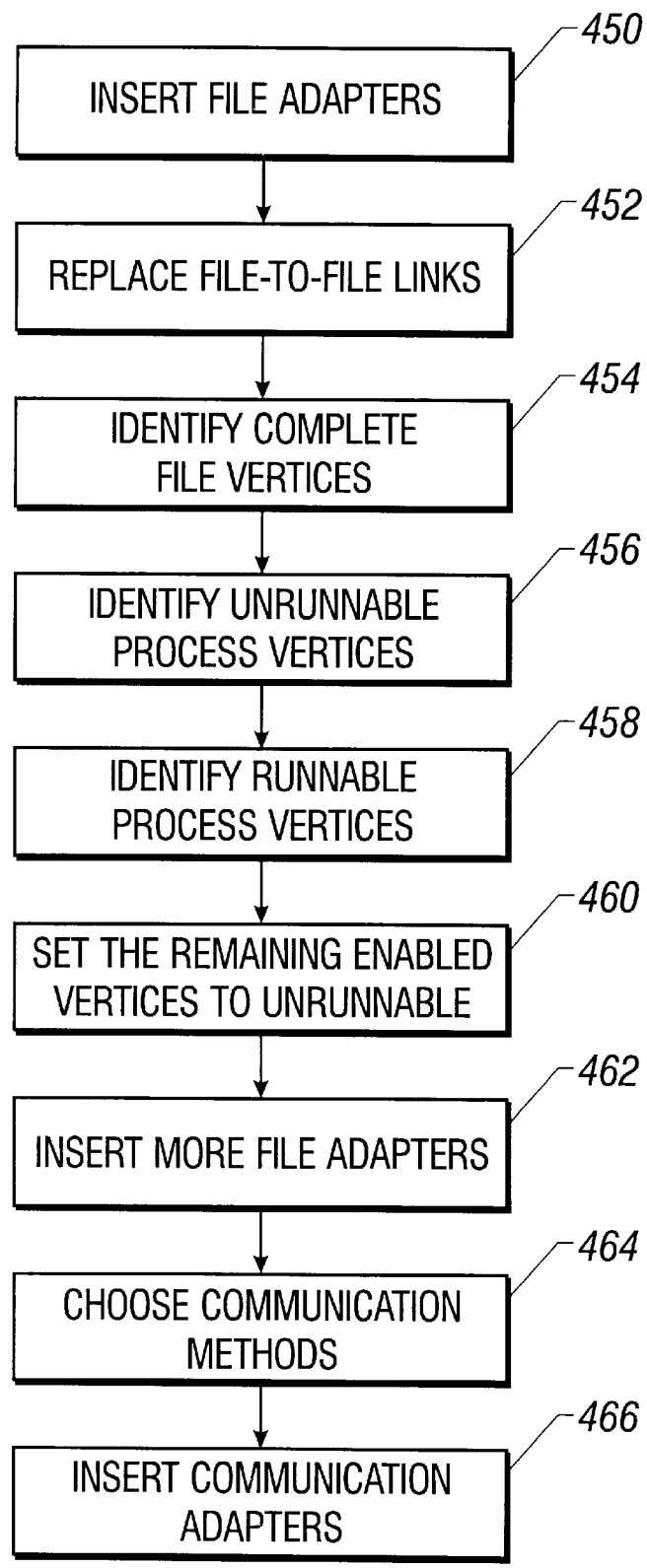

The graph transformations may be applied in any order (e.g., the graph data structures may be traversed repeatedly until all transformations are complete) until an executable graph is obtained. Turning to FIG. 4b, graph transformations are applied in one embodiment in the following steps taken in the following order: (1) insert file adapters (step 450); (2) replace file-to-file links (step 452); (3) identify Complete file vertices (step 454); (4) identify Unrunnable process vertices (step 456); (5) identify Runnable process vertices (step 458); (6) set the remaining Enabled vertices to Unrunnable (step 460); (7) insert more file adapters where conditions are met (step 462); (8) choose communication methods (step 464); and (9) insert communication adapters (step 466). The steps of this embodiment will now be described in more detail.

(1) Insert File Adapters

Figure 5A:
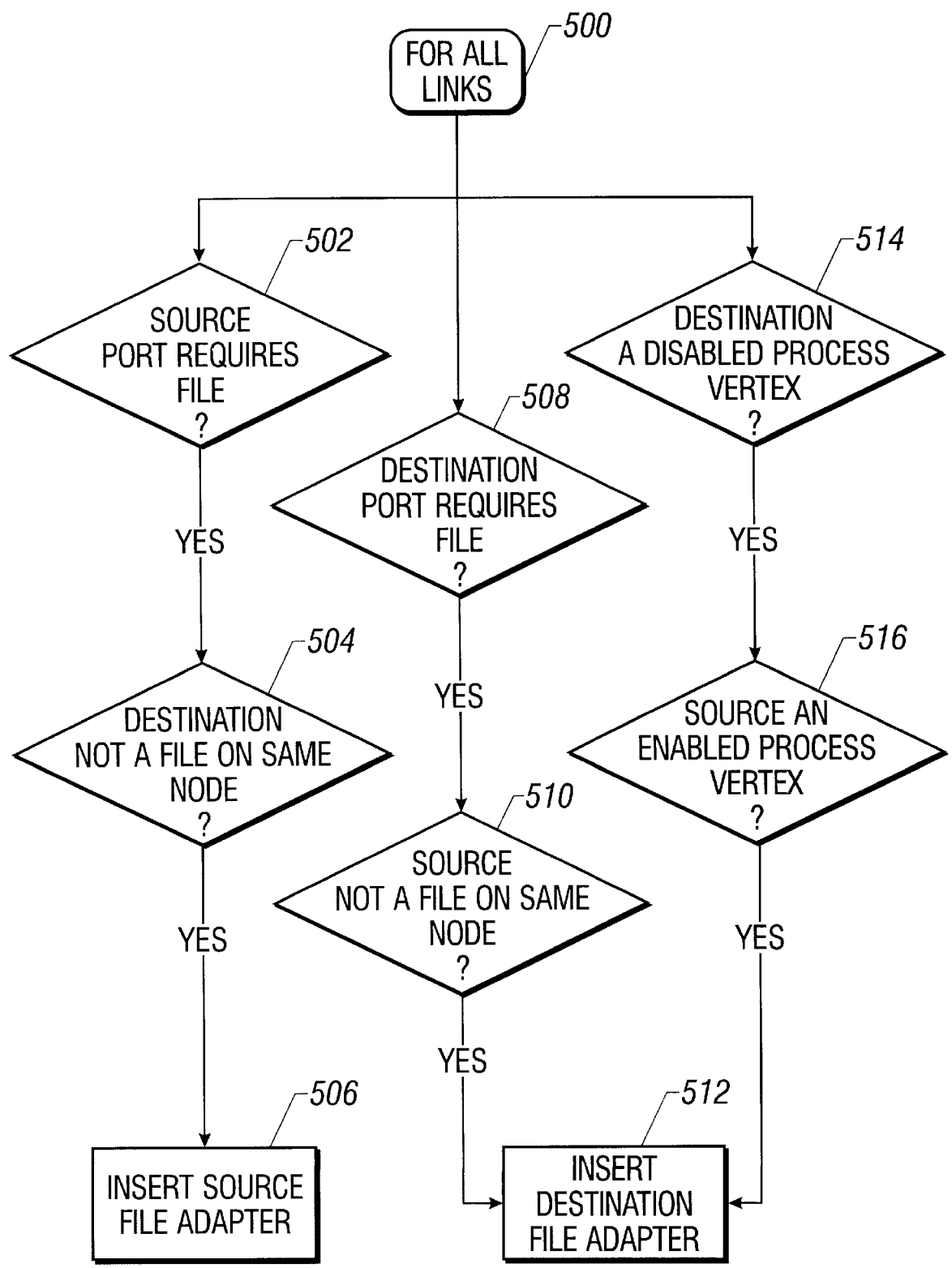
FIGS. 5a, 5b, 5c, 5d, 5e, 5f, 5g, and 5h are flow diagrams of steps of the method illustrated in FIG. 3.

Turning to FIG. 5a, to insert file adapters, the following steps are performed for all links in the graph (step 500). If the source port of a link has a data access method requiring the use of a file (step 502) and the destination is not a file on the same node (step 504), then insert a source file adapter (step 506). If the destination port of a link has a data access method requiring the use of a file (step 508) and the source is not a file on the same node (step 510), then insert a destination file adapter (step 512). If the destination of a link is a process vertex in the Disabled state (step 514) and the source is a process vertex in the Enabled state (step 516), then insert a destination file adapter (step 512).

(2) Replace File-to-File Links

Figure 5B:
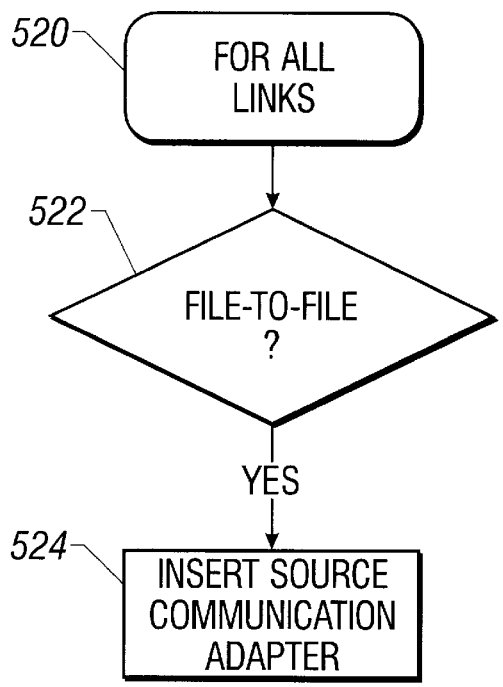

Turning to FIG. 5b, to replace file-to-file links, the following steps are performed for all links in the graph (step 520). If the source and the destination are both file vertices (step 522), then insert a source communication adapter (step 524). (If, in addition, the source and destination are on different nodes, then also insert a destination communication adapter; not shown).

(3) Identify Complete File Vertices

Figure 5C:
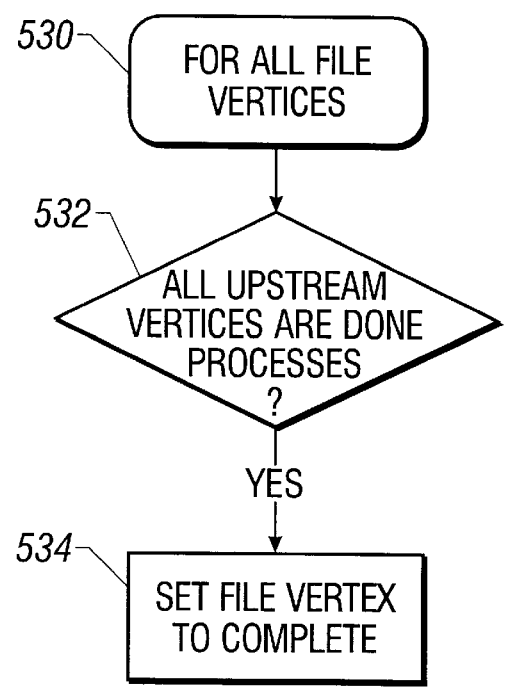

Turning to FIG. 5c, to identify Complete file vertices, the following steps are performed for all file vertices in the graph (step 530). If all upstream vertices are process vertices in the Done state (step 532), then set its state to Complete (step 534).

(4) Identify Unrunnable Process Vertices

Figure 5D:
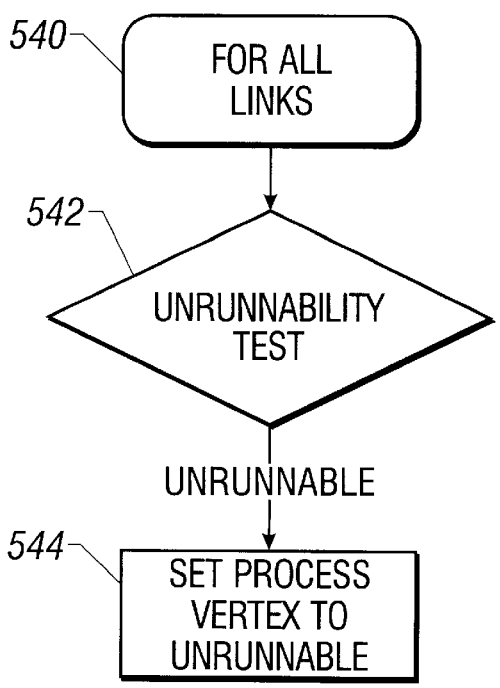

Turning to FIG. 5d, to identify Unrunnable process vertices, the following steps are performed for all links in the graph (step 540). An "Unrunnability" test is performed (step 542) as follows: if the source of a link is an Incomplete file vertex and its destination is a process vertex in the Enabled state, set the state of the process vertex to Unrunnable (step 544); if the source is a process vertex in any state other than Enabled, and the destination is a process vertex in the Enabled state, then mark the destination process vertex as Unrunnable (step 544). Repeat this testing until no more vertices may be marked as Unrunnable.

(5) Identify Runnable Process Vertices

Figure 5E:
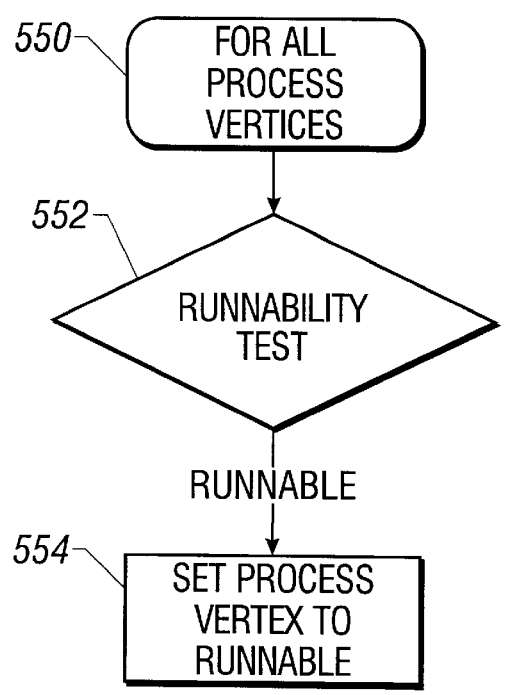

Turning to FIG. 5e, to identify Runnable process vertices, the following steps are performed for all process vertices in the graph (step 550). A "Runnability" test is performed (step 552) as follows: if a vertex is in the Enabled state, and all upstream vertices are either Complete file vertices or Runnable process vertices, then set the state of the vertex to Runnable (step 554). Repeat this testing until no more vertices may be marked as Runnable.

(6) Set the Remaining Enabled Vertices to Unrunnable

Figure 5F:
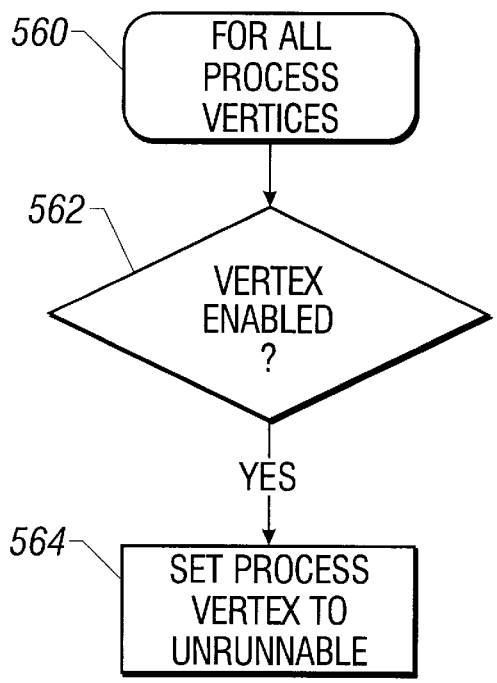

Turning to FIG. 5f, to set the remaining Enabled vertices to Unrunnable, the following steps are performed for all process vertices in the graph (step 560). If a vertex is in the Enabled state (step 562), then set its state to Unrunnable (step 564).

(7) Insert More File Adapters

Figure 5G:
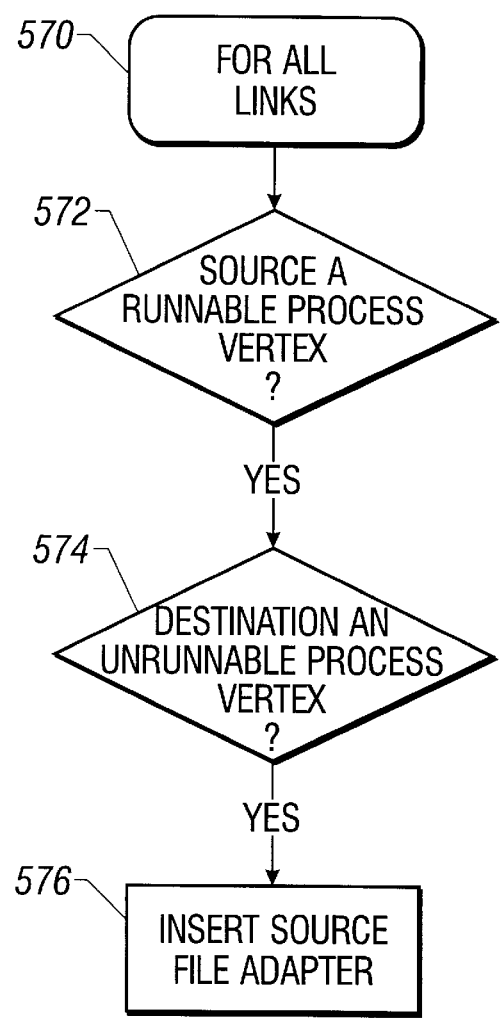

Turning to FIG. 5g, to insert more file adapters, the following steps are performed for all links in the graph (step 570). If the source of a link is a Runnable process vertex (step 572) and the destination is an Unrunnable process vertex (step 574), then insert a source file adapter (step 576).

(8) Choose Communication Methods

Figure 5H:
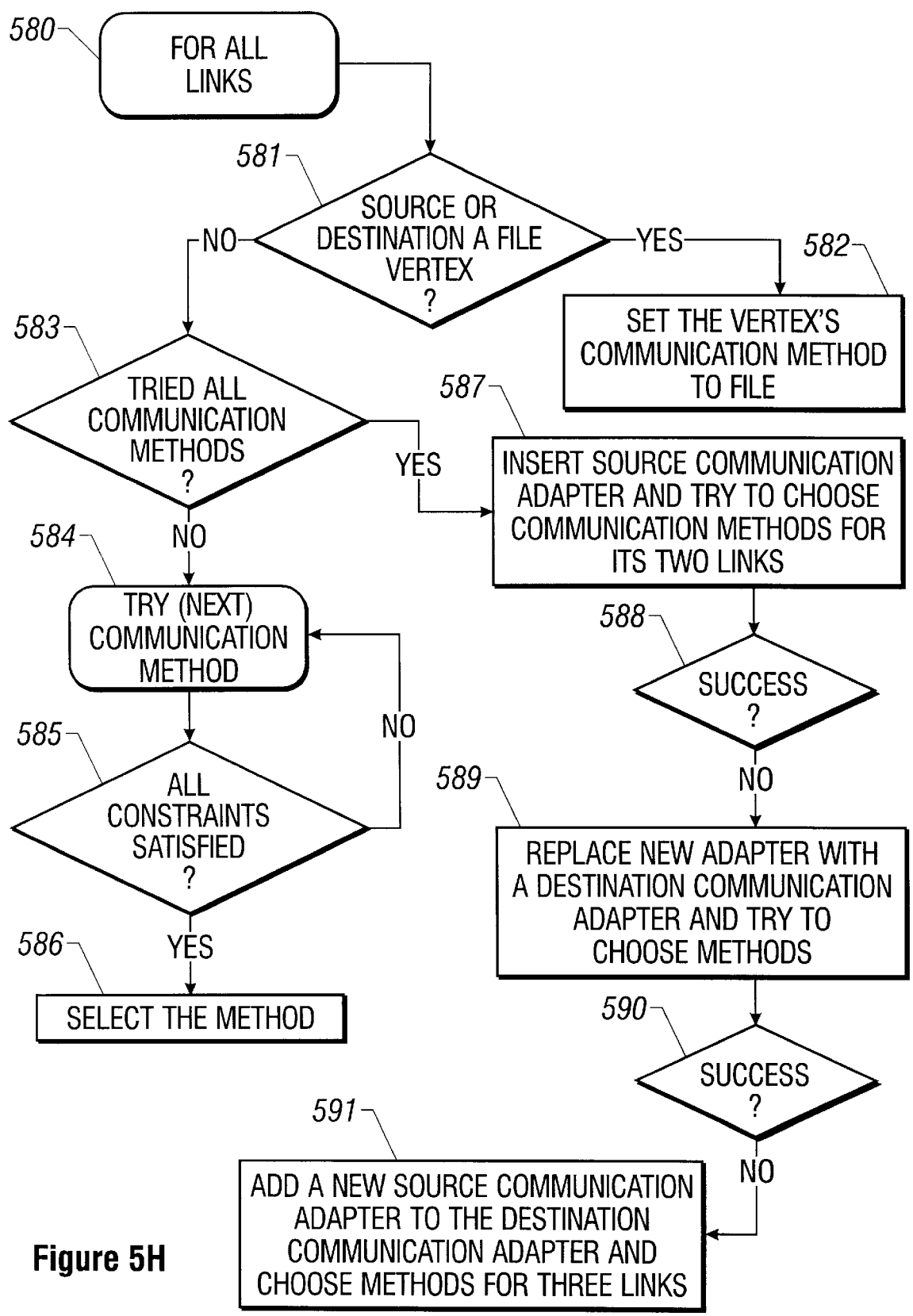

Turning to FIG. 5h, to choose communication methods, the following steps are performed for all links in the graph (step 580). This step only applies to links which are attached, at either end, to a runnable process, and which are not bound to a communication method. If a link's source (destination) is a file vertex (step 581), and its destination (source) is a process vertex on the same node, then set the link's communication method to File (step 582). Otherwise, choose one of the available communication methods, such that all of the constraints of that method are satisfied (steps 583–585). For speed, communication methods may be considered in the order Shared Memory, NamedPipe, and TCP/IP. The first method that satisfies the constraints set forth above is selected (step 586). In the reference substrate, the following rules may be used: First, if a link is attached to a port which accepts SOC connections, then the link will use Shared Memory if the source and destination are on the same node, or TCP/IP if they are on different nodes. Otherwise, if the source and destination are on the same node, a NamedPipe method will be used. In all other cases, no single communication method suffices, and the system will restore to a communication adapter (below).

(9) Insert Communication Adapters

If no single communication method is selected in the preceding step of choosing a communication method and all have been tried (step 583), continue by inserting a source communication adapter and trying to choose communication methods for the two links of the adapter (step 587). If this fails (step 588), try replacing the newly inserted source communication adapter with a destination communication adapter (step 589). If this fails (step 590), insert both a source and a destination communication adapter, and choose communication methods for three links in the resulting double adapter (step 591). In the reference substrate, communication adapters are only required if the source and the destination are on different nodes, and the link is connected to either a file vertex or a process vertex not accepting the SOC connection method. In this case, adapters may be chosen as follows:

If the source is a file vertex, then insert a source communication adapter. The two links in the source communication adapter will use, in turn, the File and the TCP/IP communication methods.

If the source is a port not accepting the SOC communication method, then insert a source communication adapter. The two links in the source communication adapter will use, in turn, the TCP/IP and File communication methods.

If the destination is a file vertex, then insert a destination communication adapter.

The two links in the adapter will use, in turn, the TCP/IP and File communication methods.

If the destination is a port not accepting the SOC communication method, then insert a destination communication adapter. The two links in the adapter will use, in turn, the TCP/IP and NamedPipe communication methods.

Phase C: Launching Data Links

Figure 6:
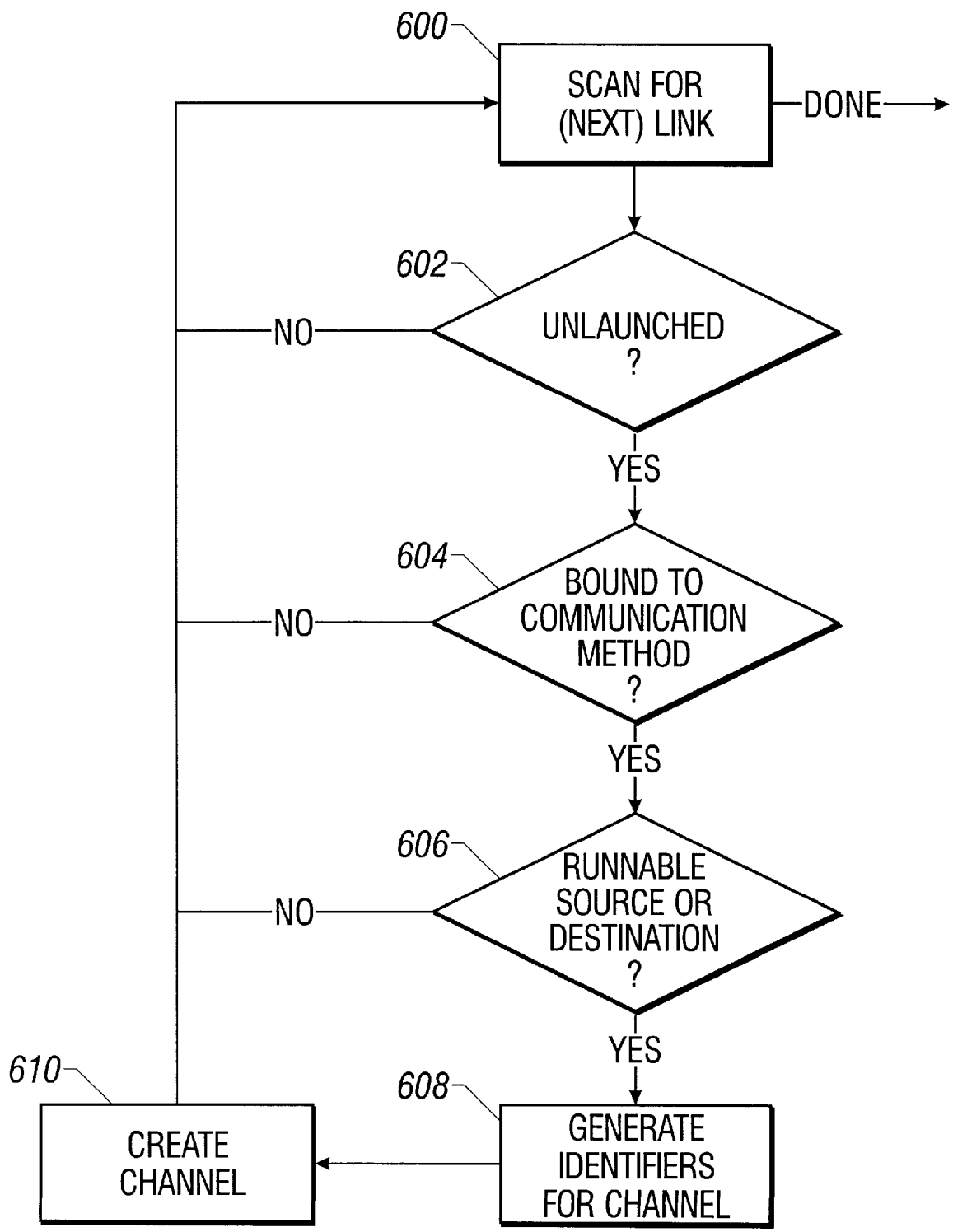
FIG. 6 is a flow diagram of steps of the method illustrated in FIG. 3.

Turning to FIG. 6, data links are created in the Unlaunched state and must be launched. To launch links, links are scanned (step 600) to find links that are Unlaunched (step 602), bound to communication methods (step 604), and have Runnable sources or destinations (step 606). For all such links, identifiers are generated that may be used by the various communication methods (step 608). For the extended substrate described above, identifiers are created as follows. All links have two identifiers: the stream object identifier and the communication channel/file identifier. The stream object identifier is used by the SOC mechanism, and is identical to the name of the link. The channel/file identifier is used to identify the file, named pipe, shared memory region, or TCP/IP connection employed by the link. Additionally, in cases where the process vertex requires the NamedPipe or File communication methods, the channel/file identifier will be made available so that the process vertex, when launched (see below), will be able to attach to the channel/file using the UNIX file system.

After the identifiers are generated, the substrate is called to create a channel or stream object (step 610). If the communication method is NamedPipe, the substrate is also called to create the named pipe.

Phase D: Creating the Link File

The extended substrate maintains, on each node, a "link file" which enumerates the links which have either a source or a destination on that node. Programs may consult this link file at run-time to determine which links they must access. This is commonly done for programs which use the SOC interface. Accordingly, in the case of the extended substrate, the system must create the link file. This is done as follows: For every node involved in the computation, the driver 200 identifies Runnable process vertices assigned to that node and, for every link attached to such a vertex, accumulates and stores in a link file the following information:

the identifier for the vertex;

the name of the port the link is attached to;

the identifier for the communication channel; and the identifier for the file or named pipe used to transport data, if applicable.

Phase E: Launching Processes

Figure 7:
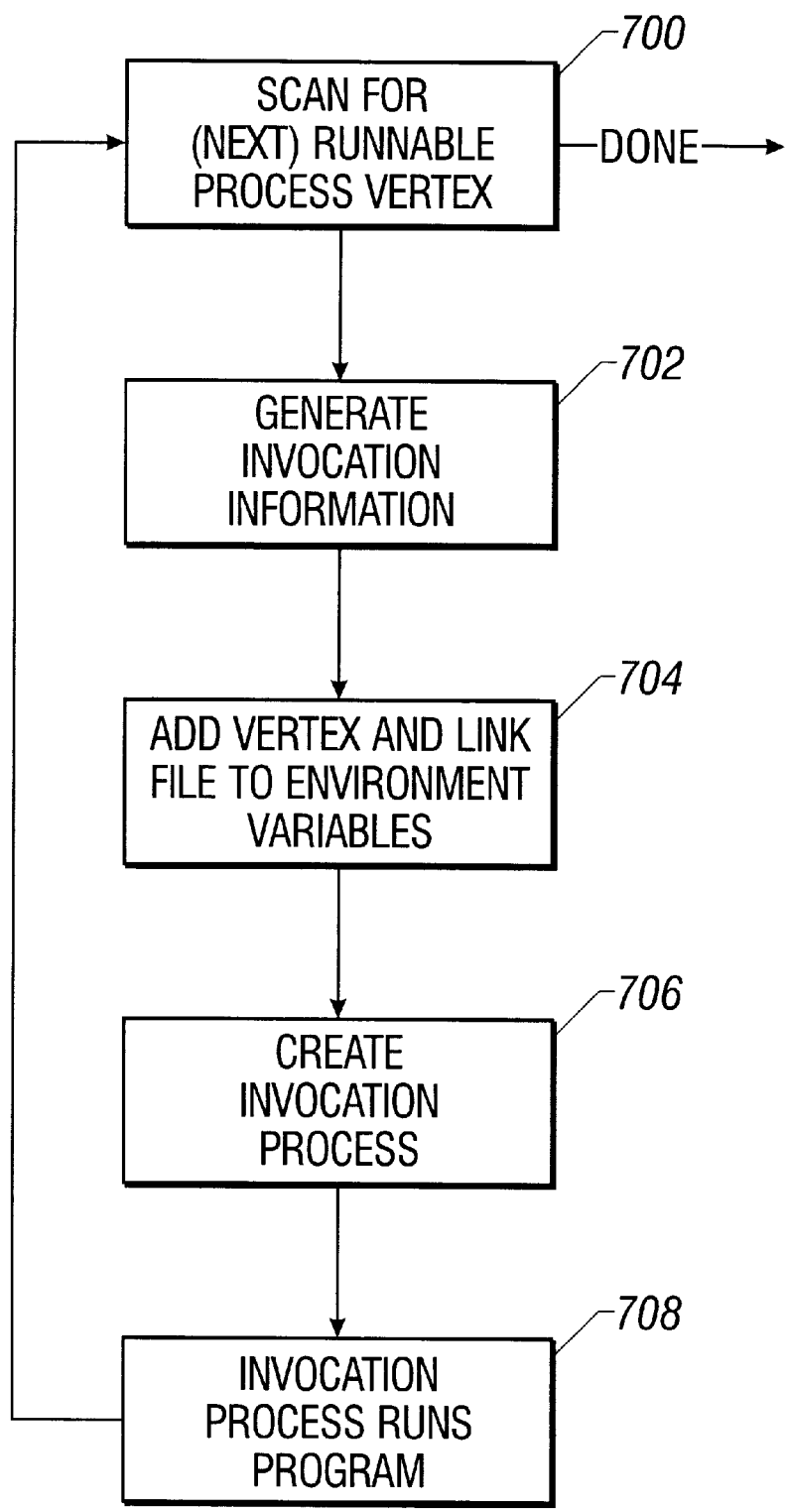
FIG. 7 is a flow diagram of steps of the method illustrated in FIG. 3.

Turning to FIG. 7, processes are launched by performing the following steps for all process vertices in the Runnable state (step 700). First, the program template for the vertex is used to generate invocation information (step 702). This information includes:

the name of the program to be invoked;

command-line arguments (command line arguments may contain identifiers for the communication channels and files associated with the links attached to the vertex);

optionally, values for various environment variables; and optionally, the expected "exit code" of the program.

Invocation information may be generated in one of at least two ways: the driver 200 may pre-store such information in a program template; or the driver 200 may contain routines for dynamically computing such information, and may store the addresses of those routines in the program template.

Next, the identifier of the vertex and the identifier of the link file for the vertex's node are added to the set of environment variables (step 704). Then an agent running on the indicated node creates a "program invocation process" (step 706). If the program's template requires that an input or output port be bound to a UNIX file descriptor, the program invocation process is provided with the name of the file, named pipe, or TCP/IP stream identifier associated with the input or output port, and will open that file or named pipe using the indicated file descriptor. The program invocation process sets up the required environment variables and runs the indicated program using the indicated command-line arguments (step 708).

Phase F: Waiting

Once all processes have been launched, the system will monitor their execution, preferably using the same agents as were used to launch them. Periodically, the system (agent) will notice that a process has exited. When this happens, the system (agent) will determine whether the process exited "normally" or "abnormally". In the case of UNIX, this is done via a termination code. The termination code may indicate that the program aborted due to program error, arithmetic exception, invalid memory access, etc. Such cases are always interpreted as "abnormal termination." Alternately, the program may have exited in a controlled fashion, returning an "exit code" (exit codes comprise a subset of the termination codes.) By convention, an exit code of 0 indicates the program terminated normally, with all other codes indicating abnormal termination. As noted above, the program template may alter this interpretation, e.g., declaring that all exit codes are to be interpreted as "normal" termination.

As soon as the system determines that a process has terminated normally, it may optionally enter a "debugging" routine to allow the user to diagnose the reason for the abnormal termination. Once debugging is complete (or skipped), the system will initiate an abort procedure, e.g., killing all processes which are still running, deleting partially written files, etc. The driver program will then exit.

If the system determines that a process terminated normally, it will note this fact and wait for more processes to terminate. When all processes have terminated normally, the system proceeds to cleaning-up phase I.

Phase I: Cleaning Up

After execution of all Runnable processes has finished, the driver 200 performs the following steps. First, the link file for each node is deleted. Second, all links in the Launched state are scanned. If all process vertices attached to a link are in the Done state, the substrate will be used to destroy any communication channels associated with the link. For the extended substrate, this is done by obtaining the stream object identifier for the link, and commanding the substrate to destroy the indicated stream object. In the case where the communication method is NamedPipe, this will also cause the named pipe to be deleted. In addition, if a file adapter vertex is Complete, and all processes downstream from it are Done, its file will be deleted.

Inserting Adapters

Several circumstances have been mentioned in which an adapter is inserted in place of a link. An adapter is a data link, or a file or process vertex (the adapter vertex), and another data link that are inserted in order to synthesize a communication link using a sequence of communication methods. Adapters in which the adapter vertex is a process are referred to as "communication adapters". Adapters in which the adapter vertex is a file are referred to as "file adapters". In general, communication adapters are added when a combination of communication methods (e.g., a named pipe plus a TCP/IP connection) is required to satisfy the constraints imposed by the source and destination of the link. File adapters are added in cases where the source and destination of a link do not run at the same time (e.g., the source is runnable, but the destination is unrunnable or disabled), or where the source or destination of a link can only attach to files. In the case of communication adapters, the adapter vertex specifies a program which copies its input to its output, and which may attach to any sort of communication channel. The adapter links may subsequently be bound to any communication method, subject to the constraints described in steps 583–585 "choosing a communication method". The adapter vertex simply copies data from its input to its output. The adapter links may have any convenient communication method, subject to source and destination constraints.

Figure 8:
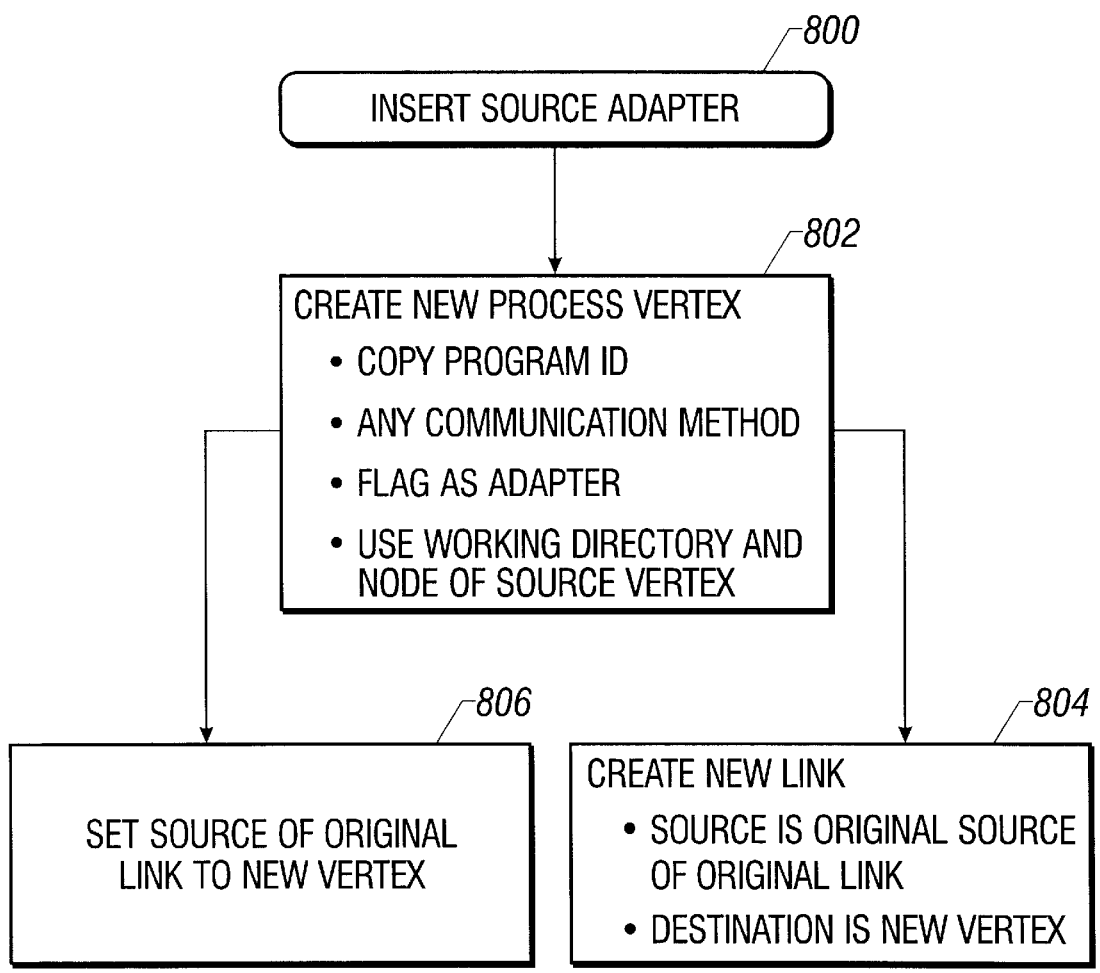
FIG. 8 is a flow diagram illustrating the steps of inserting a source adapter in accordance with the present invention.

Turning to FIG. 8, to insert a source adapter (step 800), a new adapter vertex (step 802) and a new adapter link are created (step 804). In the case of a source communication adapter, the adapter vertex is a process vertex having the following characteristics:

The program template specifies a copy program, i.e., one that copies all input data to its output.

The program template specifies input and output port descriptors capable of attaching to any communication method.

The new vertex is flagged as an adapter vertex.

The working directory and working node of the original source vertex are used as the working directory and node of the adapter vertex.

In the case of a source file adapter, the adapter vertex is a file vertex having the following characteristics:

The file is located on the node used by the source program.

The file is located in the working directory of the source program.

The file is marked as being an "adapter" so that, when it has been consumed by the destination process, it may be deleted.

The new adapter link (step 804) has the following characteristics:

The source vertex of the adapter link is the same as the source vertex of the original link, and the source port name of the adapter link is the same as the source port name of the original link.

The destination vertex of the adapter link is the adapter vertex, and the destination port name of the adapter link is Input.

The communication method of the adapter link is set to a value specified by the procedure inserting the source adapter (often this will be Unbound).

Lastly, the source of the original data link will be set to the new adapter vertex (step 806), and the source port name will be set to Output.

The procedure for inserting a destination adapter vertex is symmetric, with "source" and "destination", and "Input" and "Output", respectively, being interchanged.

Figure 9A:
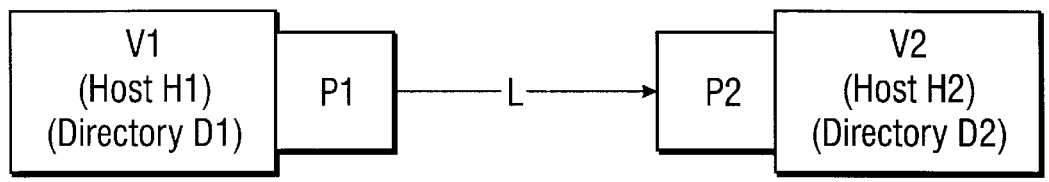
FIG. 9a is a block diagram of an illustrative graph.
Figure 9B:
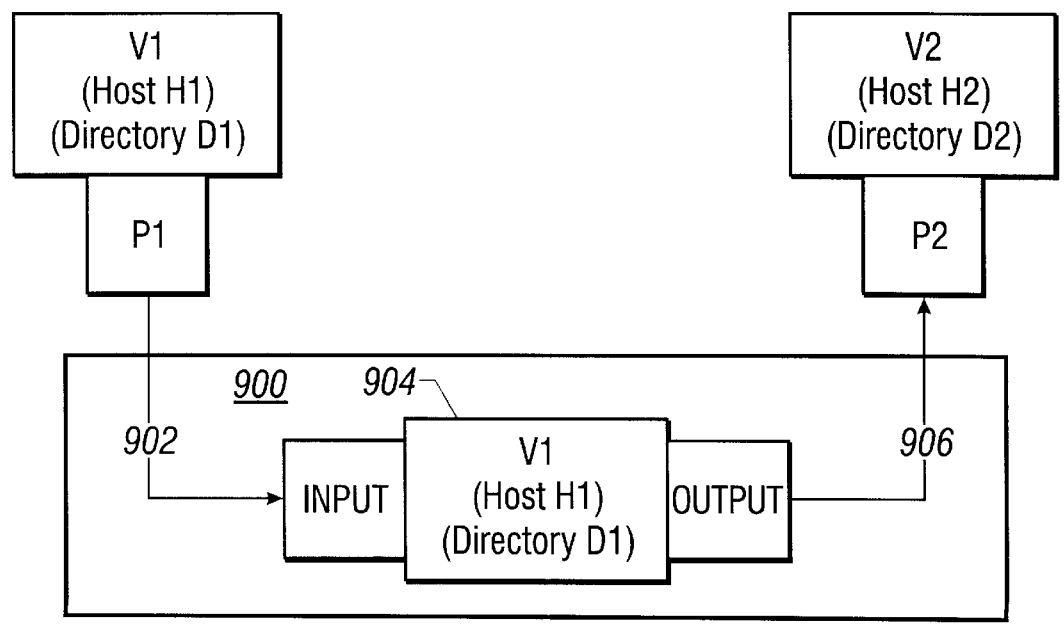
FIG. 9b illustrates the insertion of a source adapter in accordance with the present invention.

FIGS. 9a and 9b illustrate the insertion of a communication adapter 900 in place of link L between port P1 of vertex V1 and port P2 of vertex V2. In FIG. 9b, link L has been replaced by a source adapter 900 including a first link 902, a vertex 904, and a second link 906. If the adapter 900 is a file adapter, the vertex 904 is a file vertex for a file in directory D1 on host H1, which are the directory and host of vertex V1. If the adapter 900 is a communication adapter, the vertex 904 is a process vertex running a copy program. The second link 902 is the original link L with its source vertex set to the adapter vertex 904 and its source port name set to Output. The source port name of the first link 902 is the set to the original source port name, P1, of the original link L, and its destination vertex is the Input port of the newly added vertex 904.

Were the new adapter 900 a destination adapter, the vertex 904 would use the host H2 and directory D2 of the destination vertex V2 rather than the host H1 and directory D1 of the source vertex V1.

Example of Inputting and Executing a Graph

Figure 10:
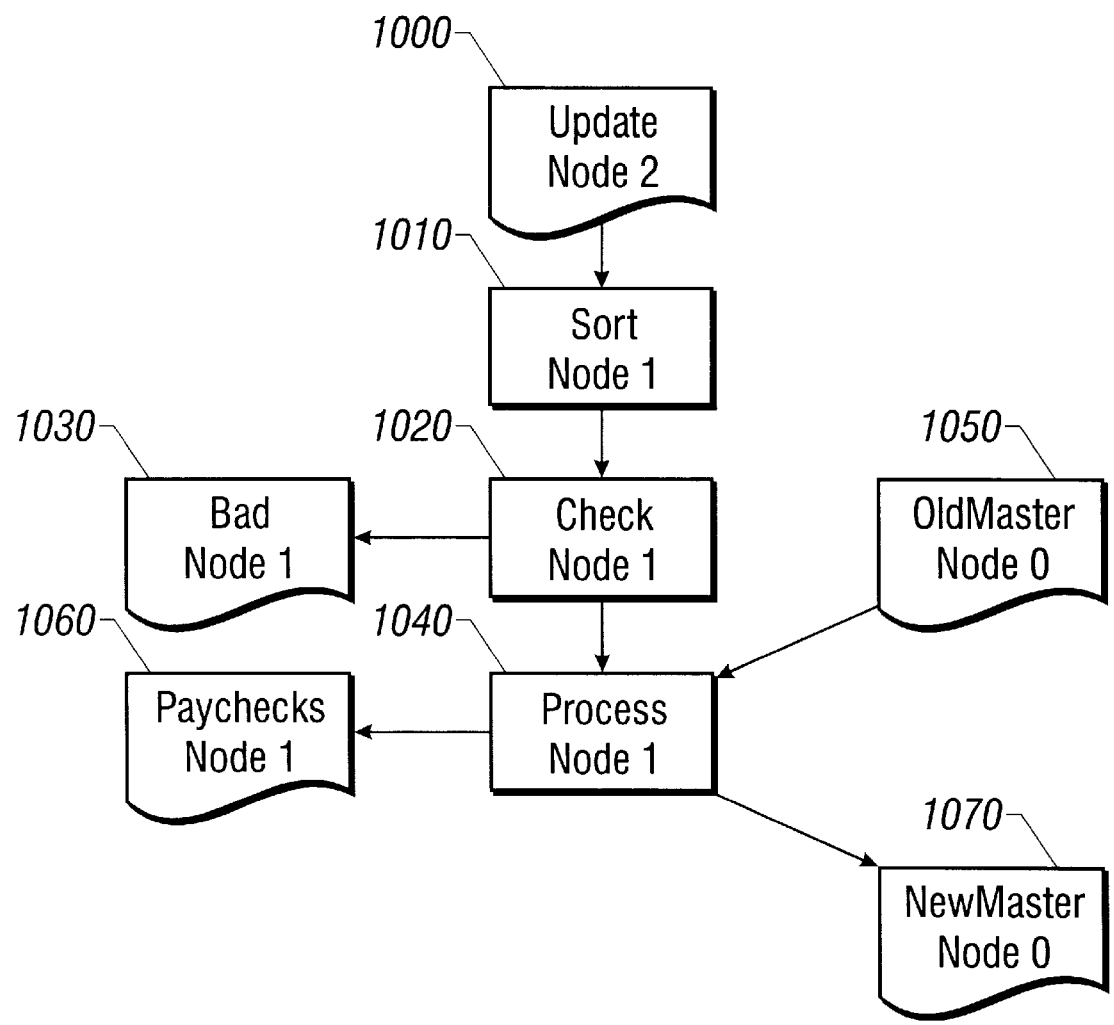
FIG. 10 is a first phase of an example graph to which the invention is applied.

We will now consider this invention as applied to the payroll program described in FIG. 1. First, prior to creating the application, the user will have provided the system with templates for all required programs, specifically for the sort program, the data-checker program, and the payroll program. The user then expresses the application as a graph, as described above. The resulting graph is shown in FIG. 10, having vertices 1000–1070 running on nodes 0, 1, and 2 as shown (the names of the ports that various links are attached to are omitted, but should be obvious from comparison with FIG. 1b).

Figure 11:
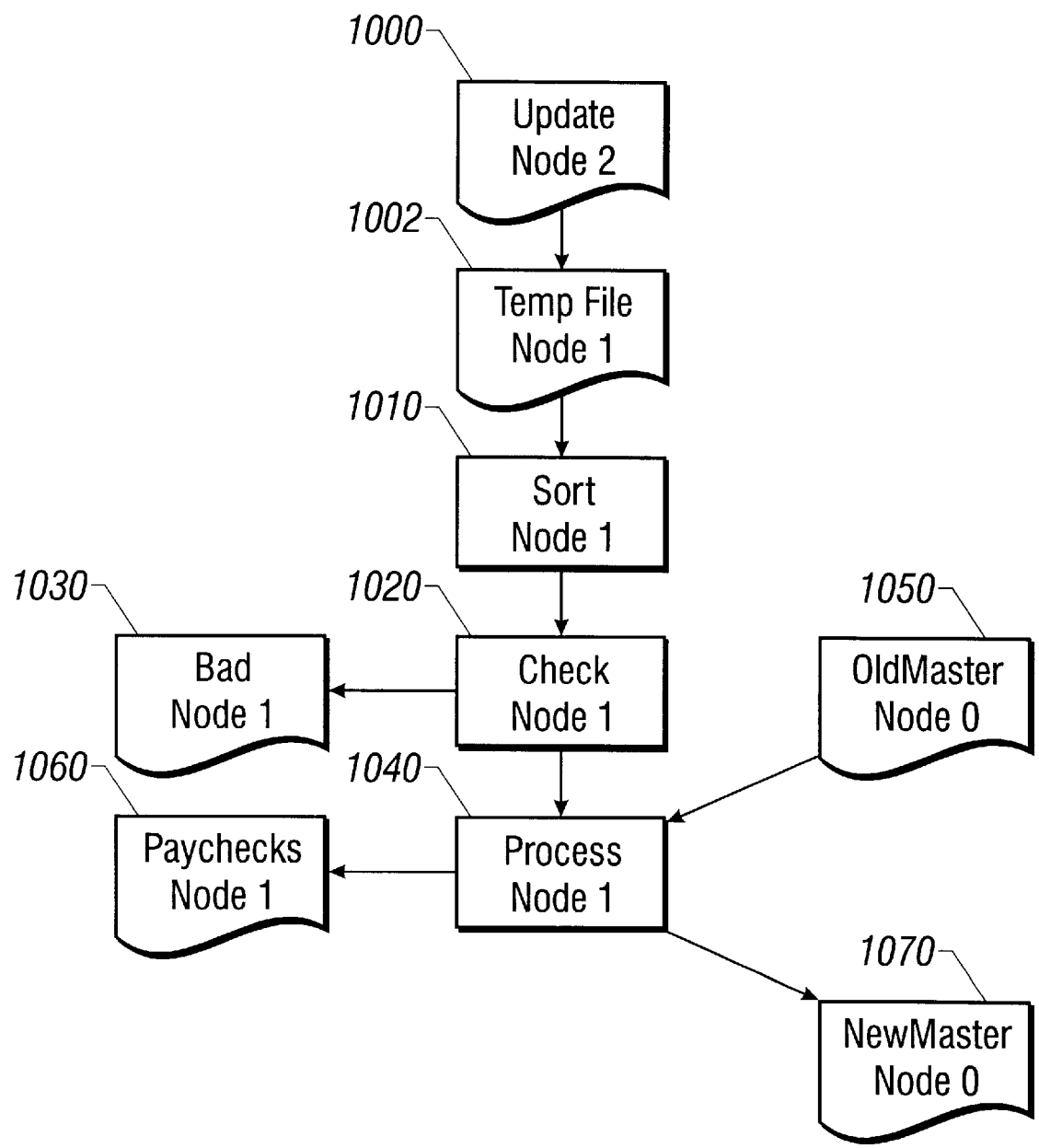
FIG. 11 is a second phase of an example graph to which the invention is applied.

The first step in processing this graph is to prepare the graph for execution. First, while executing step 450, we consult the template for the Sort program 1010, and observe that it requires a file as input. Therefore, step 450 inserts a destination file adapter 1002 (FIG. 11).

Figure 12:
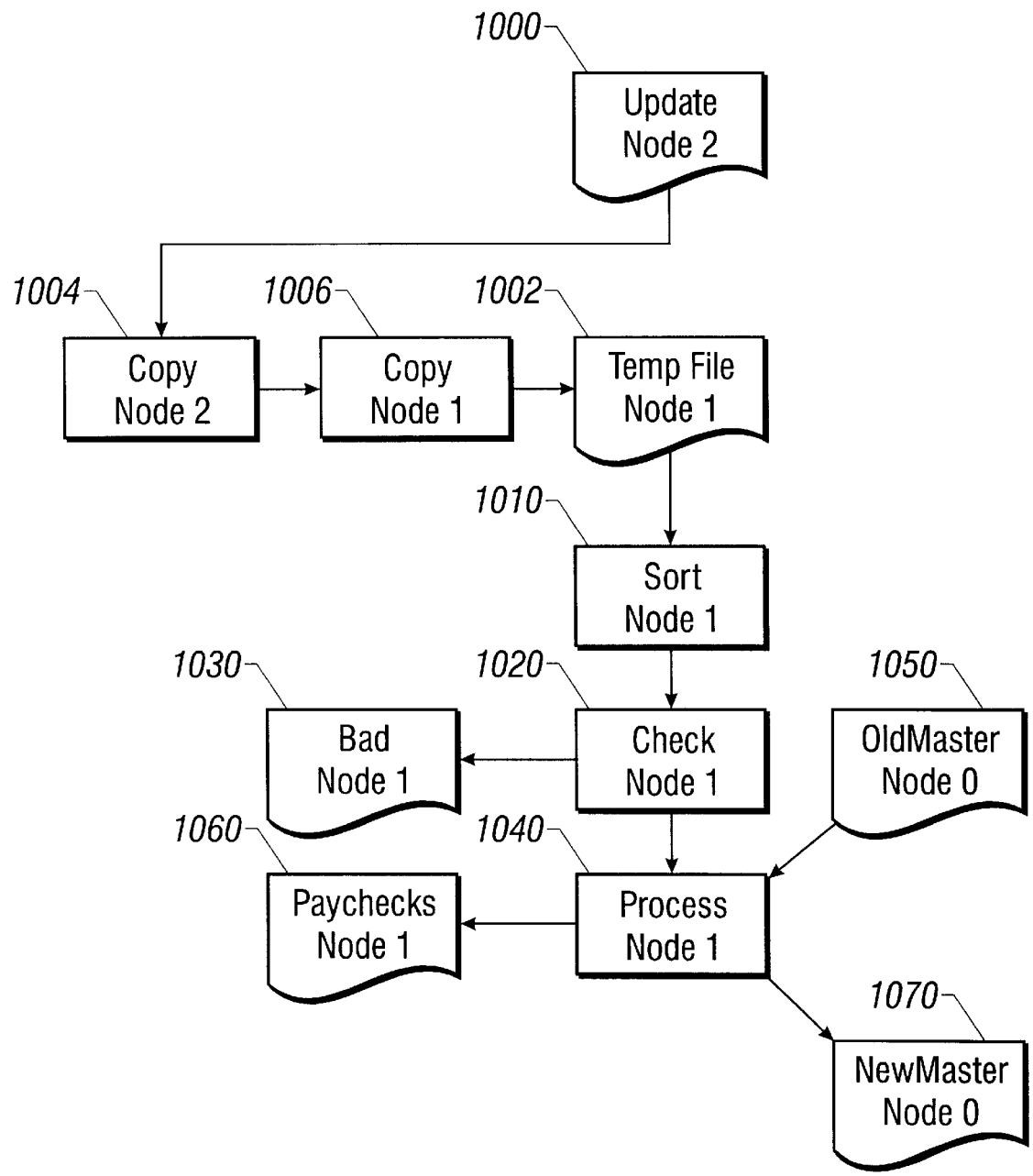
FIG. 12 is a second phase of an example graph to which the invention is applied.

We next execute step 452, and note that we have a link from the Update file 1000 on node 2 to the Temporary File 1002 on node 1. Accordingly, both source and destination communication adapters (Copy 1004, Copy 1006) will be inserted into this link (FIG. 12).

Figure 13:
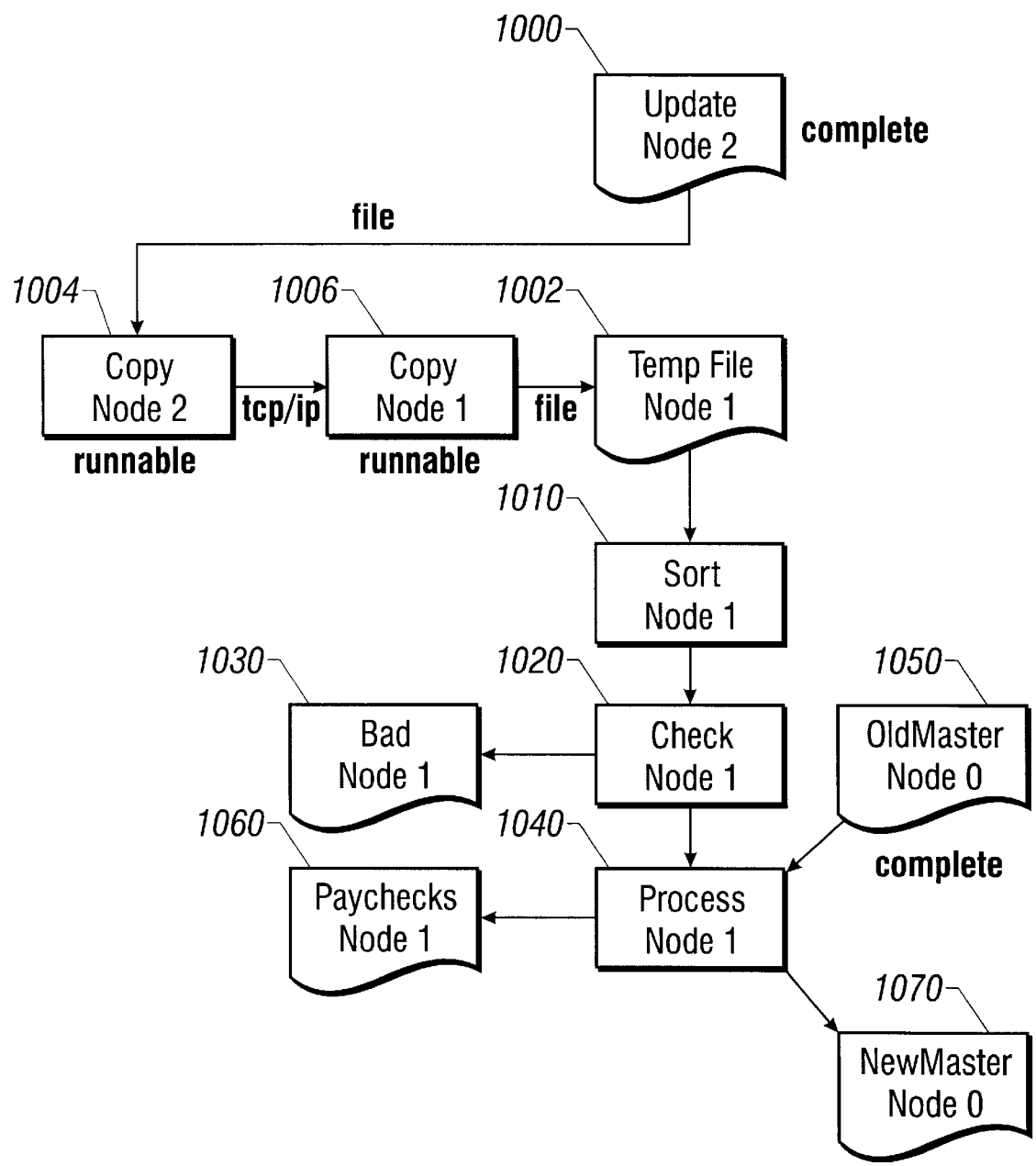
FIG. 13 is a third phase of an example graph to which the invention is applied.

Next, in step 454 we identify complete file vertices (Update 1000 and Old Master 1050). Once this is done, in step 456 we look for process vertices which are unrunnable because they have incomplete files upstream. The Sort program 1010 is found to satisfy this criteria. In step 458 we identify process vertices which are runnable because they have only runnable process vertices and/or complete files upstream. The two Copy programs 1004, 1006 (i.e., the communication adapters inserted in step 452) meet this criteria, and are marked as runnable. All remaining nodes are marked as unrunnable. Finally, communication methods are chosen for those links attached to runnable processes vertices. The File method is chosen for those links attached to files, and TCP/IP is chosen for the link between the two Copy programs 1004, 1006 (which are on different nodes.) This leaves us with the situation shown in FIG. 13 (vertices not marked as runnable/complete are unrunnable/incomplete; links not marked with a communication method are unbound.)

Figure 14:
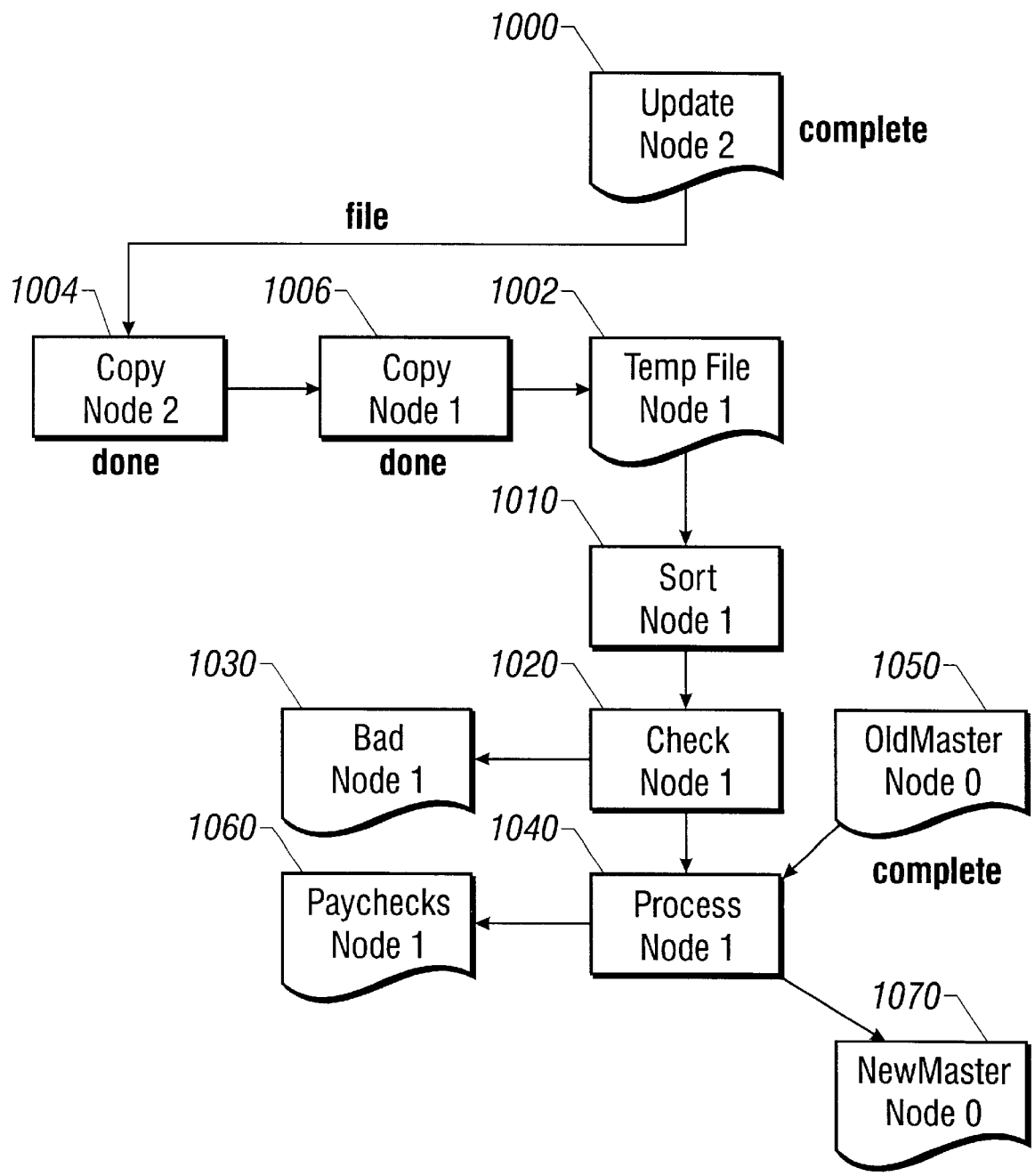
FIG. 14 is a fourth phase of an example graph to which the invention is applied.

The graph is now executable. A link file will be created (not shown), then the indicated links will be launched, and the runnable process vertices will be launched. When all processes have exited, the system will "clean up" by unlaunching the indicated links and changing the states of process vertices from "runnable" to "done". This results in the situation shown in FIG. 14.

Figure 15:
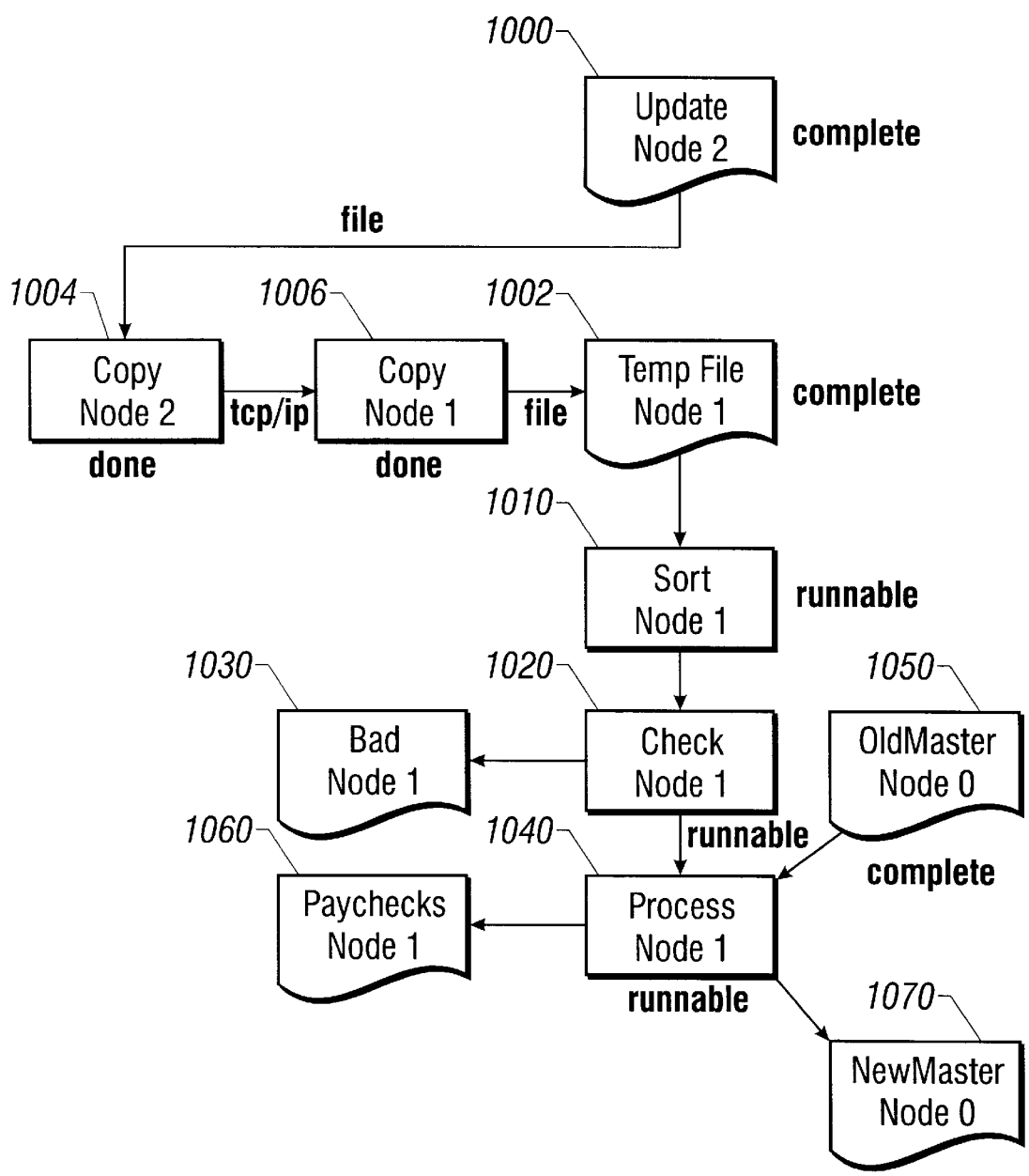
FIG. 15 is a fifth phase of an example graph to which the invention is applied.

The system now determines that not all processes are done, so it begins a new round of execution. First, it prepares the graph, as before. It starts by noting that the Temp File 1002 is complete. Next, it determines that there are no unrunnable process vertices. Finally, it determines that, in fact, all process vertices are runnable. This results in the situation shown in FIG. 15.

We are now ready to select communication methods (step 464). First, the links attached to Temp File 1002, Bad 1030, and Paychecks 1060 are set to File, because they connect files and runnable process vertices and do not cross a node boundary. Second, the remaining links attached to Check 1020 are set to NamedPipe, because Check 1020 requires named pipes, and these links do not cross node boundaries.

Figure 16:
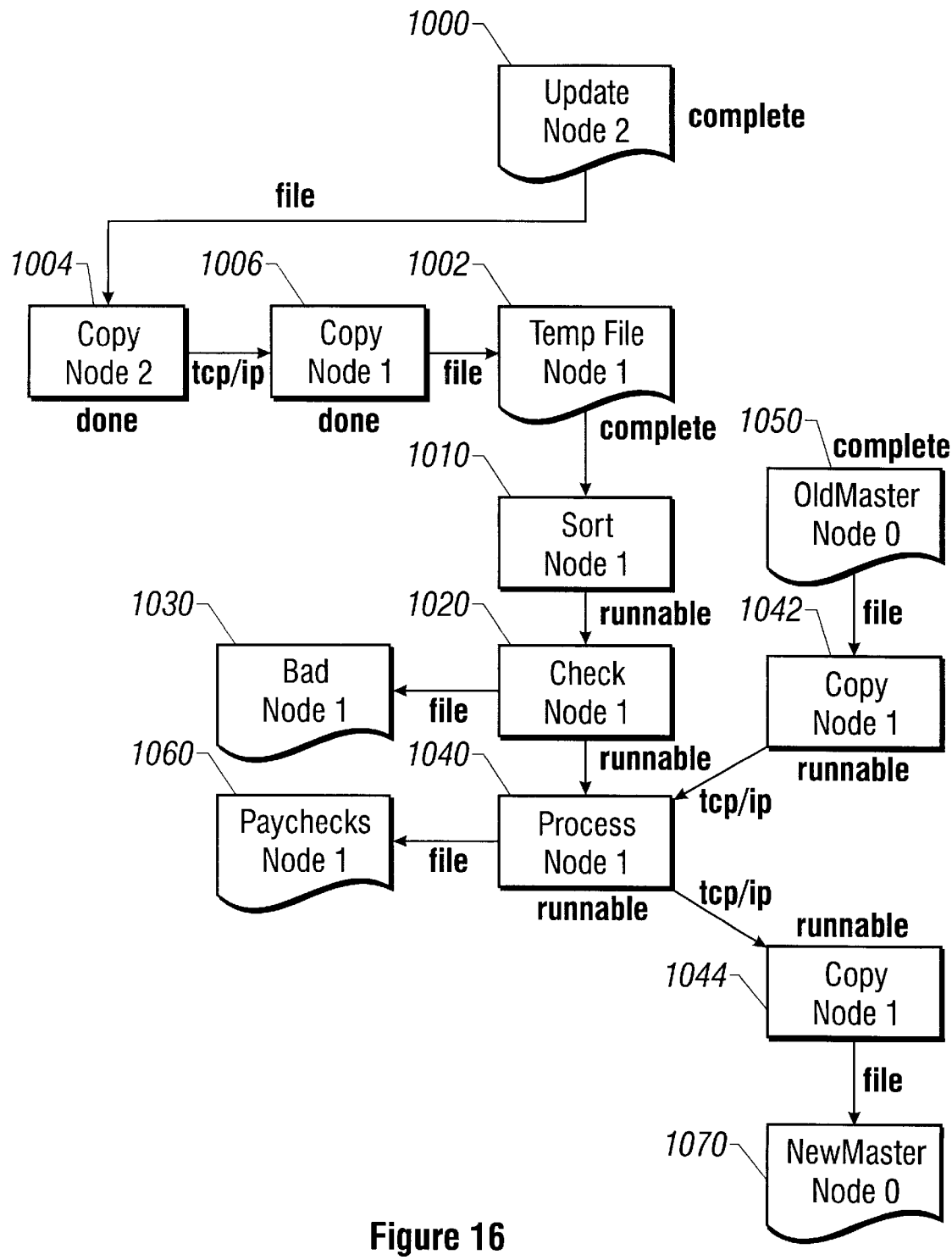
FIG. 16 is a sixth phase of an example graph to which the invention is applied.

This leaves us with the connections between OldMaster 1050, NewMaster 1070, and Process 1040, which connect files with a process running on a different node. Both cases require a communication adapter, which are inserted in step 466 as Copy 1042 and Copy 1044. Both adapters run on Node 1. Once communication methods are chosen (File for links connecting to files, and TCP/IP for links crossing node boundaries), we have the graph shown in FIG. 16.

Again, the graph is ready for execution. The system will create a link file, launch links and processes, wait, and clean up. At this point, all process vertices are "done", so execution of the graph terminates.

Program Implementation

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method for executing, on a computer system, a graph expressing a computation having a first vertex representing a first process of the computation, a second vertex representing a second process of the computation, and a link connecting the first vertex to the second vertex and representing a flow of data between the first process and the second process, where the first vertex and second vertex each has a state associated with it, the link has a communication method associated with it, the connection between the first vertex and the link has a first access method associated with it, and the connection between the second vertex and the link has a second access method associated with it, the method comprising:

(a) preparing the graph for execution by performing graph transformation steps on the computer system at least until the first vertex and the second vertex are each in a runnable state, and the link is associated with a particular communication method that is compatible with the first access method and the second access method;

(b) launching the link by creating, by means of the computer system, a combination of communication channels and/or data stores compatible with the communication method of the link; and (c) launching the first process and the second process by invoking execution of the first process and the second process on the computer system.

2. A method for executing, on a computer system, a graph expressing a computation having a first vertex representing a first process of the computation, a second vertex representing a second process of the computation, and a link connecting the first vertex to the second vertex and representing a flow of data between the first process and the second process, where the first vertex and second vertex each has a state associated with it, the link has a communication method associated with it, the connection between the first vertex and the link has a first access method associated with it, and the connection between the second vertex and the link has a second access method associated with it, the method comprising:

(a) preparing the graph for execution by performing graph transformation steps including steps selected from the group of steps comprising: inserting a vertex representing a file, inserting a vertex representing a copy process, setting the state of a vertex representing a file to a complete state, setting the state of a vertex representing a process to a runnable state, setting the state of a vertex representing a process to an unrunnable state, and setting a link's communication method—at least until the first vertex and the second vertex are each in a runnable state, and the link is associated with a particular communication method that is compatible with the first access method and the second access method;

(b) launching the link by creating, by means of the computer system, a combination of communication channels and/or data stores compatible with the communication method of the link; and (c) launching the first process and the second process by invoking execution of the first process and the second process.

3. The method of claim 2 where the graph further has a third vertex representing a file used by a process of the computation.

4. The method of claim 3 where the third vertex is a file vertex.

5. The method of claim 2 where the first vertex is a process vertex.

6. The method of claim 2 where the link is a data link.

7. The method of claim 2 where:

(a) the first process and the second process execute on different nodes of a computer system; and (b) the particular communication method is an inter-processor communication method.

8. The method of claim 7 where the inter-processor communication method is TCP/IP.

9. A method for executing, on a computer system, a graph expressing a computation having a first vertex representing a first process of the computation, a second vertex representing a file read by the first process of the computation, and a link connecting the second vertex to the first vertex and representing a flow of data from the file to the first process, where the first vertex and second vertex each has a state associated with it, the link has a communication method associated with it, the connection between the first vertex and the link has a first access method associated with it, and the connection between the second vertex and the link has a second access method associated with it, the method comprising:

(a) preparing the graph for execution by performing graph transformation steps including steps selected from the group of steps comprising: inserting a vertex representing a file, inserting a vertex representing a copy process, setting the state of a vertex representing a file to a complete state, setting the state of a vertex representing a process to a runnable state, setting the state of a vertex representing a process to an unrunnable state, and setting a link's communication method—at least until the first vertex is in a runnable state and the second vertex is in a complete state, and the link is associated with a particular communication method that is compatible with the first access method and the second access method;

(b) launching the link by creating, by means of the computer system, a combination of communication channels and/or data stores compatible with the communication method of the link; and (c) launching the first process by invoking execution of the first process.

10. The method of claim 9 where the graph further has a third vertex representing a file used by a process of the computation.

11. The method of claim 10 where the third vertex is a file vertex.

12. The method of claim 9 where the first vertex is a process vertex.

13. The method of claim 9 where the link is a data link.

14. The method of claim 9 where:

(a) the first process and the second process execute on different nodes of a computer system; and (b) the particular communication method is an inter-processor communication method.

15. The method of claim 14 where the inter-processor communication method is TCP/IP.

16. A method for executing, on a computer system, a graph expressing a computation comprising a plurality of vertices representing computational processes, each vertex having an associated access method, and a plurality of links, each link connecting at least two vertices to each other and representing a flow of data between the connected vertices, comprising the steps of:

(a) accepting the graph into the computer system as user input;

(b) preparing the graph for execution by performing, on the computer system, graph transformation steps until at least some vertices are in a runnable state, and each link connecting such runnable state vertices are associated with a communication method compatible with the access methods of the runnable state vertices connected by the link;

(c) launching each link having an associated communication method by creating, by means of the computer system, a combination of communication channels and/or data stores compatible with the communication method of the link;

(d) launching each runnable state process by invoking execution of the process on the computer system; and (e) repeating steps (b) through (d) until the entire computation expressed as a graph is executed on the computer system.

17. A system for executing, on a computer system, a graph expressing a computation the graph having links connecting vertices, process vertices each representing a process, and file vertices each representing a file, the system comprising:

(a) means for preparing the graph for execution;

(b) means for launching links of the graph; and (c) means for launching processes represented by vertices of the graph.

18. The system of claim 17 where the means for preparing the graph for execution includes:

(a) means for inserting at least one vertex representing a file;

(b) means for inserting at least one vertex representing a copy process;

(c) means for setting the state of at least one vertex representing a file to a complete state;

(d) means for setting the state of at least one vertex representing a process to a runnable state;

(e) means for setting the state of at least one vertex representing a process to an unrunnable state; and (f) means for setting a link's communication method.

* * * * *